US012730593B2

(12) United States Patent
Wakabayashi

(10) Patent No.: US 12,730,593 B2
(45) Date of Patent: Sep. 8, 2026

(54) INFORMATION PROCESSING APPARATUS CAPABLE OF BLE COMMUNICATION, CONTROL METHOD THEREFOR, AND STORAGE MEDIUM STORING CONTROL PROGRAM THEREFOR

(71) Applicant: CANON KABUSHIKI KAISHA, Tokyo (JP)

(72) Inventor: Mizuki Wakabayashi, Chiba (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 281 days.

(21) Appl. No.: 18/596,771

(22) Filed: Mar. 6, 2024

(65) Prior Publication Data

US 2024/0311060 A1 Sep. 19, 2024

(30) Foreign Application Priority Data

Mar. 17, 2023 (JP) ................................ 2023-043061

(51) Int. Cl.
*G06F 3/12* (2006.01)

(52) U.S. Cl.
CPC ............ *G06F 3/121* (2013.01); *G06F 3/1234* (2013.01); *G06F 3/1292* (2013.01)

(58) Field of Classification Search
CPC ...... G06F 3/121; G06F 3/1234; G06F 3/1292; G06F 3/1236
USPC ........................................................ 358/1.14
See application file for complete search history.

(56) References Cited

U.S. PATENT DOCUMENTS 9,395,939 B2 * 7/2016 Kumamoto ......... G06F 11/0793
10,895,837 B2 * 1/2021 Ogino ..................... G06F 3/121
2015/0212773 A1 * 7/2015 Thijssen ................ G06Q 10/06 358/1.15
2017/0286021 A1 * 10/2017 Katano ................. G06F 3/1292
2023/0336980 A1 * 10/2023 Lim .................. H04W 12/0431

FOREIGN PATENT DOCUMENTS

JP 2017188875 A 10/2017

* cited by examiner

*Primary Examiner* — Neil R McLean
(74) *Attorney, Agent, or Firm* — ROSSI, KIMMS & McDOWELL LLP

(57) ABSTRACT

An information processing apparatus that prevents one mobile terminal from occupying BLE communication until completing error handling. The information processing apparatus executes a predetermined process based on data received from a mobile terminal and includes a function to obtain information from the mobile terminal by first wireless communication after establishing communication connection with the mobile terminal, the information being necessary for second wireless communication different from the first wireless communication, a function to disconnect the communication connection by the first wireless communication and to establish communication connection by the second wireless communication in response to obtainment of the information, a function to measure a distance between the information processing apparatus and the mobile terminal by the second wireless communication, and a function to notify of, when an error relating to the predetermined process occurs, the error by a method other than the first wireless communication based on the measured distance.

12 Claims, 26 Drawing Sheets

1
101
108
BLE
Wi-Fi
UWB
121
Wi-Fi
102
WIRELESS LAN TERMINAL
103
INTERNET
104
BLE
109
UWB
122
105
BLE
110
UWB
123
106
BLE
112
107
BLE
111
UWB
124

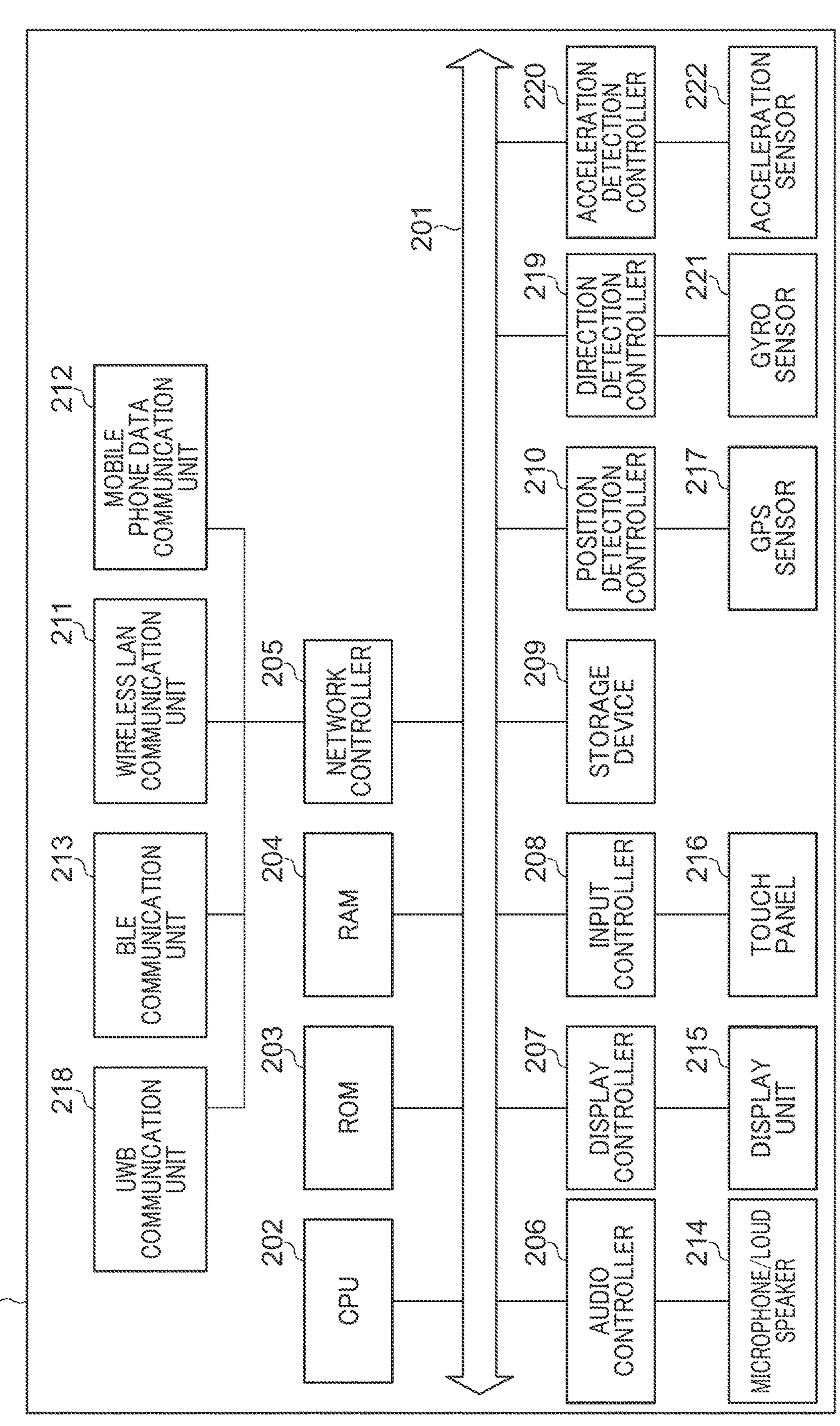
FIG. 2
101
201
202
CPU
203
ROM
204
RAM
205
NETWORK CONTROLLER
206
AUDIO CONTROLLER
207
DISPLAY CONTROLLER
208
INPUT CONTROLLER
209
STORAGE DEVICE
210
POSITION DETECTION CONTROLLER
211
WIRELESS LAN COMMUNICATION UNIT
212
MOBILE PHONE DATA COMMUNICATION UNIT
213
BLE COMMUNICATION UNIT
214
MICROPHONE/LOUD SPEAKER
215
DISPLAY UNIT
216
TOUCH PANEL
217
GPS SENSOR
218
UWB COMMUNICATION UNIT
219
DIRECTION DETECTION CONTROLLER
220
ACCELERATION DETECTION CONTROLLER
221
GYRO SENSOR
222
ACCELERATION SENSOR PRINT SERVER
150
103
LAN
104
140
OPERATION UNIT
3001
109
122
1200
1201
CPU
1202
RAM
1206
OPERATION I/F
1210
NETWORK UNIT
1211
MODEM UNIT
Wi-Fi
1271
Wi-Fi COMMUNICATION UNIT
1272
BLE COMMUNICATION UNIT
1273
UWB COMMUNICATION UNIT
1203
ROM
1204
HDD
1207
1205
Image Bus I/F
1209
TIMER UNIT
1208
INTERNAL COMMUNICATION I/F
10
SCANNER UNIT
2008
1260
RIP
1280
SCANNER IMAGE PROCESSOR
1290
PRINTER IMAGE PROCESSOR
1230
IMAGE ROTATOR
1240
IMAGE COMPRESSOR
1220
DEVICE I/F
20
PRINTER UNIT 101
MOBILE TERMINAL
401
PRINT APPLICATION
402
UI MODULE
403
SEARCH MODULE
409
DOCUMENTS
404
PRINT CONTROLLER
407
Web BROWSER
408
OTHER APPLICATIONS
411
PLATFORM
405
BLE COMMUNICATION CONTROLLER
406
UWB COMMUNICATION CONTROLLER
410
Wi-Fi COMMUNICATION CONTROLLER
IMAGE FORMING APPARATUS
104

104
IMAGE FORMING APPARATUS
501
PRINT APPLICATION
502
UI MODULE
514
COPY MODULE
503
SEARCH MODULE
507
LOGIN AUTHENTICATION SERVICE
509
USER ACCOUNTS
504
PRINT MODULE
515
READING MODULE
513
TRANSMISSION MODULE
510
PLATFORM
505
BLE COMMUNICATION CONTROLLER
506
UWB COMMUNICATION CONTROLLER
512
Wi-Fi COMMUNICATION CONTROLLER
508
PRINT JOBS
511
DOCUMENTS
101
MOBILE TERMINAL

Figure 12:
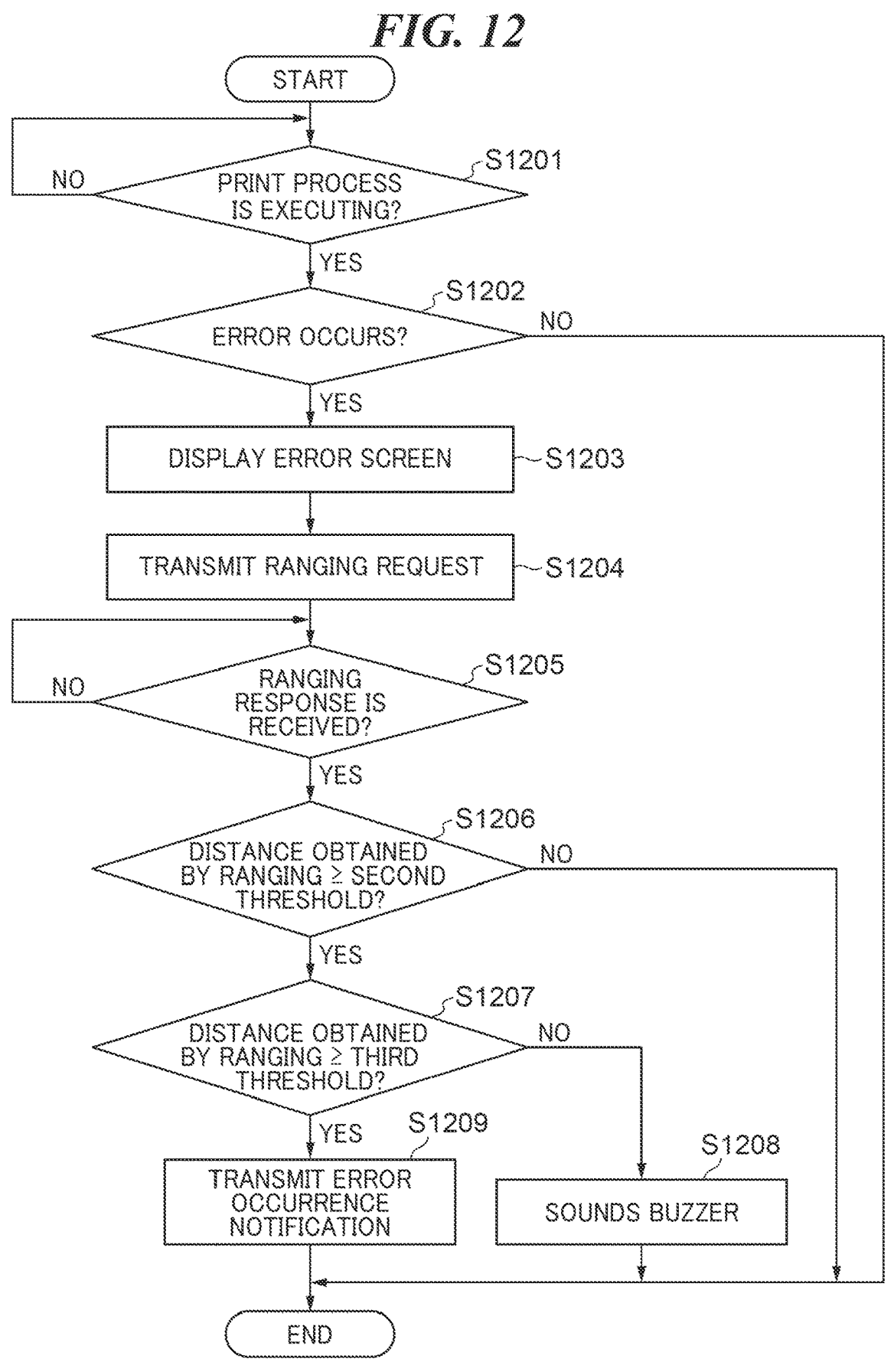

START
PRINT PROCESS IS EXECUTING? (S1201) — NO / YES
ERROR OCCURS? (S1202) — NO / YES
DISPLAY ERROR SCREEN (S1203)
TRANSMIT RANGING REQUEST (S1204)
RANGING RESPONSE IS RECEIVED? (S1205) — NO / YES
DISTANCE OBTAINED BY RANGING ≥ SECOND THRESHOLD? (S1206) — NO / YES
DISTANCE OBTAINED BY RANGING ≥ THIRD THRESHOLD? (S1207) — NO / YES
TRANSMIT ERROR OCCURRENCE NOTIFICATION (S1209)
SOUNDS BUZZER (S1208)
END

FIG. 13

| | | Distance | | |
|---|---|---|---|---|
| | | Near: 3m | Middle: 5m | Far: 10m |
| Error Content | Jam | Display on Operation Unit | Display on Operation Unit/ Sound Buzzer | Display on Operation Unit/ Notify Mobile Terminal |
| | Out of Sheet | Display on Operation Unit | Display on Operation Unit/ Sound Buzzer | Display on Operation Unit/ Sound Buzzer/ Notify Mobile Terminal |
| | Sheet Left | Display on Operation Unit | Display on Operation Unit/ Sound Buzzer | Notify Mobile Terminal |

INFORMATION PROCESSING APPARATUS CAPABLE OF BLE COMMUNICATION, CONTROL METHOD THEREFOR, AND STORAGE MEDIUM STORING CONTROL PROGRAM THEREFOR

BACKGROUND OF THE INVENTION

Field of the Invention

The present invention relates to an information processing apparatus, a control method therefor, and a storage medium storing a control program therefor.

Description of the Related Art

A conventional information processing apparatus capable of communication based on a standard of Bluetooth (registered trademark) Low Energy (hereinafter referred to as "BLE") is known. The communication is referred to as "BLE communication". In the BLE communication, a peripheral device transmits advertisement information to unspecified number of central devices, and a central device selects one peripheral device based on the received advertisement information and transmits a connection request to the selected peripheral device. Upon receiving the connection request, the peripheral device stops transmitting the advertisement information and switches to one-to-one connection communication (GATT communication).

An information processing apparatus transmits various notifications by such BLE communication. For example, when an error, such as sheet out or sheet jam, occurs, a multifunction peripheral as an information processing apparatus transmits an error notification to a user's mobile terminal using the BLE communication (see Japanese Laid-Open Patent Publication No. 2017-188875 (Counterpart of U.S. 20170286021 A1), for example).

In the technique of the above-described publication, the information processing apparatus transmits an error notification to the user's mobile terminal after switching to the GATT communication, and continues the GATT communication with the user's mobile terminal until receiving a predetermined operation indicating that handling of the error is completed from the user. That is, the user's mobile terminal occupies the BLE communication with the information processing apparatus until the user completes the handling of the error. Therefore, there is a problem that a mobile terminal of another user cannot establish the BLE communication with the information processing apparatus until the user completes the handling of the error.

SUMMARY OF THE INVENTION

The present invention provides an information processing apparatus, a control method therefor, and a storage medium storing a control program therefor, which can prevent one mobile terminal from continuously occupying BLE communication until completion of handling of an error.

Accordingly, an aspect of the present invention provides an information processing apparatus that executes a predetermined process based on data received from a mobile terminal, the information processing apparatus including a function configured to obtain information from the mobile terminal by first wireless communication after establishing communication connection with the mobile terminal, the information being necessary for second wireless communication different from the first wireless communication, a function configured to disconnect the communication connection with the mobile terminal by the first wireless communication and to establish communication connection with the mobile terminal by the second wireless communication in response to obtainment of the information necessary for the second wireless communication, a function configured to measure a distance between the information processing apparatus and the mobile terminal by the second wireless communication, and a notification function configured to notify of, when an error relating to the predetermined process occurs, the error by a method other than the first wireless communication based on the measured distance.

According to the present invention, it is possible to prevent one mobile terminal from continuing to occupy BLE communication until the completion of handling of an error.

Further features of the present invention will become apparent from the following description of exemplary embodiments with reference to the attached drawings.

BRIEF DESCRIPTION OF THE DRAWINGS

FIG. 2 is a block diagram showing a hardware configuration of a mobile terminal in FIG. 1.

FIG. 9A is a view showing a configuration of a BLE advertising packet transmitted from an image forming apparatus having a UWB communication function in FIG. 1.

FIG. 9B is a view showing packet specification for use in UWB ranging in the data processing system.

FIG. 12 is a flowchart showing another procedure of the notification control process in the step S720 in FIG. 7.

FIG. 13 is a view for describing an error notification by the notification control process in FIG. 12.

DESCRIPTION OF THE EMBODIMENTS

Figure 1:
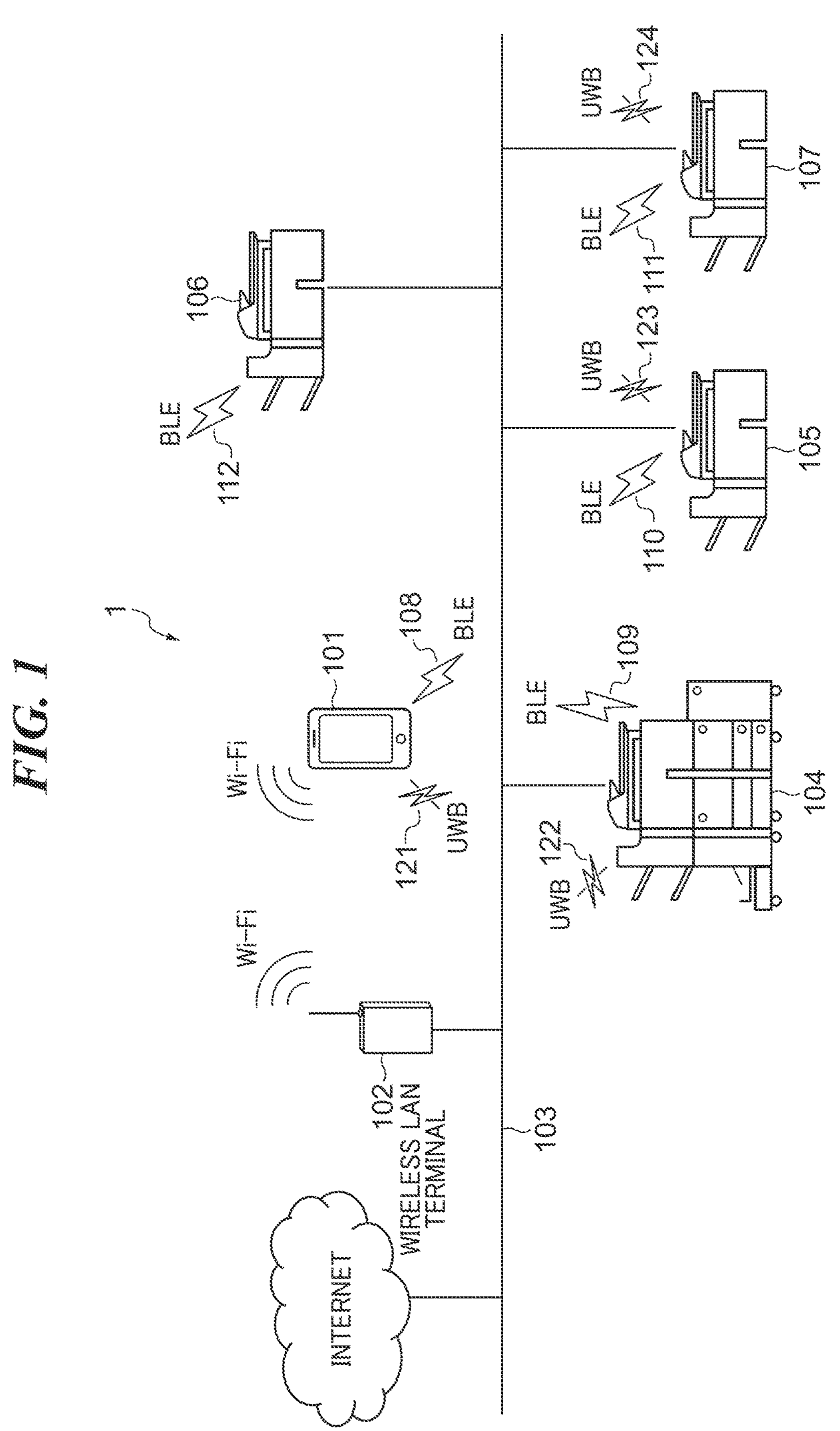
FIG. 1 is a view showing a configuration of a data processing system including an image forming apparatus as an information processing apparatus according to an embodiment of the present invention.

Hereafter, embodiments according to the present invention will be described in detail by referring to the drawings.

FIG. 1 is a view showing a configuration of a data processing system 1 including an image forming apparatus 104 as an information processing apparatus according to an embodiment of the present invention. Although an image forming apparatus is described as an example of an information processing apparatus in this embodiment, the information processing apparatus is not limited to the image forming apparatus. The information processing apparatus may be any apparatus that has a wireless communication function and executes a predetermined process based on data received from a communication apparatus.

The information processing apparatus enables BLE (Bluetooth Low Energy) communication (first wireless communication) and communication based on UWB (Ultra Wide Band) standard (hereinafter referred to as "UWB communication", second wireless communication) described later as wireless communications. In the UWB communication, a distance to a ranging target device can be measured more accurately than in the BLE communication. The BLE communication enables one-to-one communication with a communication device after establishing communication connection with the communication device. In the meantime, the UWB communication enables one-to-many communication with a plurality of communication devices with which communication connections are established.

In FIG. 1, the data processing system 1 includes a mobile terminal 101, a wireless LAN terminal 102, a LAN 103, and image forming apparatuses 104 to 107.

The mobile terminal 101 transmits a print job to any of the image forming apparatuses 104 to 107. Each of the image forming apparatuses 104 to 107 as information processing apparatuses has a printer function and a wireless communication function. Each of the image forming apparatuses 104 to 107 may further have a copy function, a scanner function, a facsimile transmission function, etc.

The LAN 103 is a local area network that wiredly connects the mobile terminal 101, the image forming apparatuses 104 to 107, etc. The apparatuses that are wiredly connected in the data processing system 1 exchange information by mutual communication via the LAN 103. The LAN 103 also is connected to the Internet.

A wireless LAN terminal 102 is a wireless LAN base station having a general network router function and provides wireless LAN through Wi-Fi in a home or an office, etc. The mobile terminal 101 shall be connected to the LAN 103 via the wireless LAN terminal 102 by enabling a Wi-Fi function. When entering a wireless LAN area provided by the wireless LAN terminal 102, the mobile terminal 101 can automatically join the LAN 103 by using preset authentication information.

Signals 108 to 112 are wireless signals transmitted and received by the mobile terminal 101 and the image forming apparatuses 104 to 107 using the BLE communication. A WPAN (Wireless Personal Area Network) is formed between the apparatuses that can exchange the signals 108 to 112.

Signals 121 to 124 are wireless signals transmitted and received by the mobile terminal 101 and the image forming apparatuses 104, 105, and 107 using the UWB communication. A WPAN is formed between the apparatuses that can exchange the signals 121 to 124. The image forming apparatus 106 does not have a UWB communication function. The image forming apparatus 107 and the mobile terminal 101 are sufficiently apart from each other, and the mobile terminal 101 cannot receive UWB radio wave (the signal 124) from the image forming apparatus 107.

FIG. 2 is a block diagram showing a hardware configuration of the mobile terminal 101 in FIG. 1.

The mobile terminal 101 is a terminal, such as a smartphone or a tablet, that can be carried by a user, and may be executing an operating system (OS) for a terminal or applications (programs) for controlling phone calls and data communication. The mobile terminal 101 may not include microphone/loud speaker 214, a GPS sensor 217, a gyro sensor 221, an acceleration sensor 222, controllers 206, 210, 219, and 220 therefor, a mobile phone data communication unit 212, etc., which will be described later. Such an apparatus is a portable personal computer like a notebook personal computer, for example. Each component of the hardware is directly or indirectly connected to a system bus 201.

As shown in FIG. 2, the mobile terminal 101 includes a CPU 202, a ROM 203, a RAM 204, a network controller 205, an audio controller 206, a display controller 207, an input controller 208, a storage device 209, a position detection controller 210, and a wireless LAN communication unit 211. The mobile terminal 101 also includes the mobile phone data communication unit 212, a BLE communication unit 213, the microphone/speaker 214, a display unit 215, a touch panel 216, the GPS sensor 217, a UWB communication unit 218, and a direction detection controller 219. The mobile terminal 101 further includes an acceleration detection controller 220, the gyro sensor 221, and the acceleration sensor 222.

The ROM 203 stores the OS and the applications for controlling phone calls and data communication in the mobile terminal 101. The applications are executed by the CPU 202. The applications for controlling the data communication include mail software and a web browser (not shown) in addition to a print application 401 that will be described later with reference to FIG. 4.

The RAM 204 is used as a memory for executing a program and a work memory area in which an application executes a program. The RAM 204 also temporarily stores data that is temporarily stored when an application executes a program.

The storage device 209 is a nonvolatile storage device and stores various operation mode settings, operation logs, etc. that are needed to hold even after the mobile terminal 101 is restarted.

The network controller 205 controls communication by the wireless LAN communication unit 211, the mobile phone data communication unit 212, the BLE communication unit 213, and the UWB communication unit 218. The wireless LAN communication unit 211 participates in the LAN 103 via the wireless LAN terminal 102. The mobile phone data communication unit 212 is used for participating in a network provided by a mobile phone carrier. The BLE communication unit 213 is used for forming the WPAN between nearby computer devices that can exchange wireless signals by the BLE communication. The UWB communication unit 218 is used to form the WPAN that enables ranging (distance measurement) and data communication between nearby computer devices that can exchange wireless signals by the UWB communication.

Here, when the mobile terminal 101 can participate in the wireless LAN, the network controller 205 prioritizes wireless LAN connection. When the mobile terminal 101 moves out of the network area of the wireless LAN, the network controller 205 is exclusively controlled so as to participate in the wireless communication network provided by the mobile phone carrier. In the meantime, the communication function is independently controlled in order to achieve the purpose of communication in the BLE communication and the UWB communication.

The audio controller 206 is used when a call application is activated and a user is making a phone call, for example. Specifically, when audio data is input and output by the microphone/loud speaker 214, the audio controller 206 mediates between the audio data and the audio data control program. The display controller 207 controls information to be output to the display 215 of the mobile terminal 101. The input controller 208 controls information instructed by a user via a button (not shown) or the touch panel 216 provided in the mobile terminal 101. The application activated on the mobile terminal 101 provides the user with network communication information and various information of the mobile terminal 101 by using the audio controller 206, the display controller 207, and the input controller 208.

The position detection controller 210 obtains position information of the mobile terminal 101 from the GPS sensor 217 and provides the position information to the OS. The direction detection controller 219 obtains direction information of the mobile terminal 101 from the gyro sensor 221 and provides the direction information to the OS. The acceleration detection controller 220 obtains acceleration information of the mobile terminal 101 from the acceleration sensor 222 and provides the acceleration information to the OS. These are controlled by the OS operating by the CPU 202.

The mobile terminal 101 enables ranging communication for measuring distances to the image forming apparatuses 104, 105, and 107 via the UWB communication unit 218. The UWB communication unit 218 supports at least TWR (Two Way Ranging) shown in FIG. 6 as a method of the ranging communication. The mobile terminal 101 transmits ranging request data via the UWB communication unit 218 and receives corresponding distance measurement response data. The mobile terminal 101 can provide the distance information generated by the CPU 202 applying a data process in response to a request timing expected by the application. In this way, the mobile terminal 101 can provide the information about distances to the image forming apparatus 104, 105, 107 in the system configuration shown in FIG. 1 and to a peripheral device (not shown) compatible with the UWB communication.

The mobile terminal 101 can also cope with a case where the image forming apparatuses 104, 105, and 107 or other peripheral devices request distance measurement. In this case, the ranging response data can be transmitted in response to the reception of the ranging request data in the ranging communication method by the TWR communication.

Figure 3:
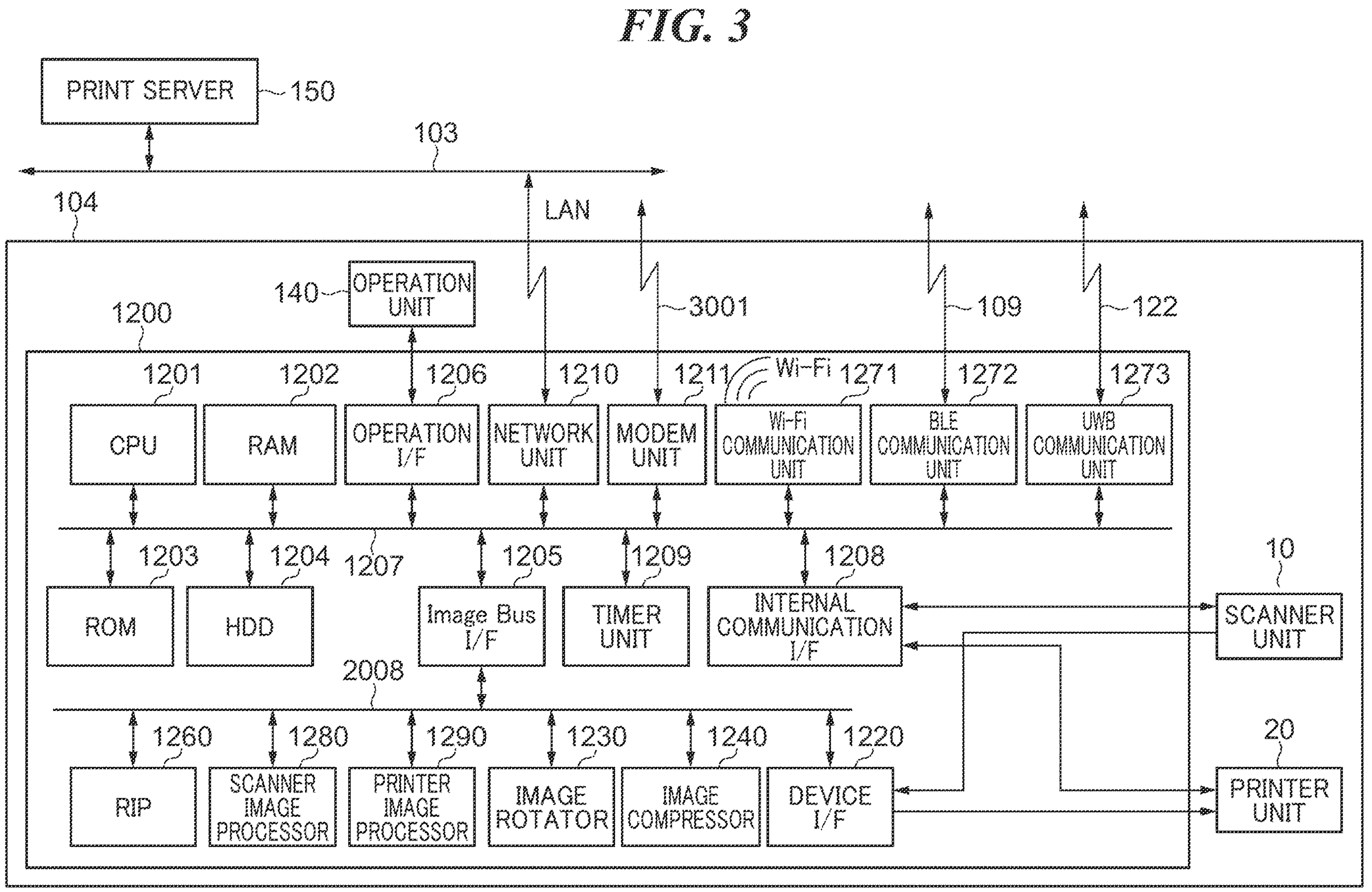
FIG. 3 is a block diagram showing a hardware configuration of the image forming apparatus in FIG. 1.

FIG. 3 is a block diagram showing a hardware configuration of the image forming apparatus 104 in FIG. 1. The image forming apparatuses 105 and 107 has the same configuration, and thus the description thereof will be omitted.

The image forming apparatus 104 includes an operation unit 140 that receives various operations by a user, a scanner unit 10 that reads image information in accordance with an instruction from the operation unit 140, a printer unit 20 that prints an image on a sheet, and a controller 1200.

The scanner unit 10 includes a CPU that controls the scanner unit 10, and an illumination lamp, a scanning mirror, etc. (not shown) for reading a document. The printer unit 20 includes a CPU that controls the printer unit 20, and a photosensitive drum, a fixing device, etc. (not shown) for forming and fixing an image.

The controller 1200 controls the scanner unit 10, the printer unit 20, and the operation unit 140, and also integrally controls communication with external information devices, such as the mobile terminal 101 and the print server 150 connected via the LAN 103, the wireless LAN, etc.

The controller 1200 includes a Wi-Fi communication unit 1271, a BLE communication unit 1272, and a UWB communication unit 1273 that enable the wireless communication with the external mobile terminal 101. These are connected to a system bus 1207 described later.

The controller 1200 also includes a raster image processor (RIP) 1260 that develops a PDL code included in a print job received from the mobile terminal 101 into a bitmap image.

The controller 1200 includes a scanner image processor 1280 that corrects, processes, and edits image data input from the scanner unit 10.

The controller 1200 includes a printer image processor 1290 that corrects image data to be output (printed) by the printer unit 20 and converts the resolution, and an image rotator 1230 that rotates the image data.

The controller 1200 also includes an image compressor 1240 that applies a JPEG compression/decompression process to multi-valued image date and applies a JBIG, MMR, or MH compression/decompression process to binary image date.

The controller 1200 includes a device I/F 1220 that connects the scanner unit 10 and the printer unit 20 to the controller 1200 and converts image data between a synchronous system and an asynchronous system.

The controller 1200 further includes an image bus 2008 that mutually connects the RIP 1260, the scanner image processor 1280, the printer image processor 1290, the image rotator 1230, the image compressor 1240, and the device I/F 1220 and transfers image date at high speed.

The controller 1200 includes a CPU 1201 that integrally controls the image forming apparatus 104.

The controller 1200 also includes a RAM 1202 that is a system work memory used for operation of the CPU 1201 and is also an image memory for temporarily storing image date.

The controller 1200 also includes an operation I/F 1206. An image to be displayed on the operation unit 140 is output to the operation unit 140 via the operation I/F 1206. The operation I/F 1206 has a function of transmitting information input by a user who uses the image forming apparatus 104 through the operation unit 140 to the CPU 1201.

The controller 1200 also includes a network unit 1210 that is connected to the LAN 103 and communicates (transmits and receives) with the print server 150 and other computer terminals (not shown) on the LAN 103.

The controller 1200 includes a modem unit 1211 that is connected to a public line 3001 and communicates (transmits and receives) data with an external facsimile machine (not shown).

The controller 1200 also includes a ROM 1203 that stores a boot program executed by the CPU 1201 and a hard disk drive (HDD) 1204 that stores system software, image data, software counter values, etc.

The controller 1200 includes an internal communication I/F 1208 that communicates with the scanner unit 10 and the printer unit 20, and a timer unit 1209 that is used for clocking in the ranging by the UWB communication described later.

Further, the controller 1200 includes a system bus 1207. The system bus 1207 mutually connects the CPU 1201, RAM 1202, operation I/F 1206, timer unit 1209, network unit 1210, modem unit 1211, ROM 1203, HDD 1204, and internal communication I/F 1208.

The controller 1200 includes an image bus I/F 1205 that functions as a bus bridge that connects the system bus 1207 and an image bus 1212 and converts a data structure.

The controller 1200 records and manages histories, such as a user name, the number of copies, color print information, and print attribute information, in executing jobs, such as a print job and a copy job, as job log information in the HDD 1204 or the RAM 1202.

Figure 4:
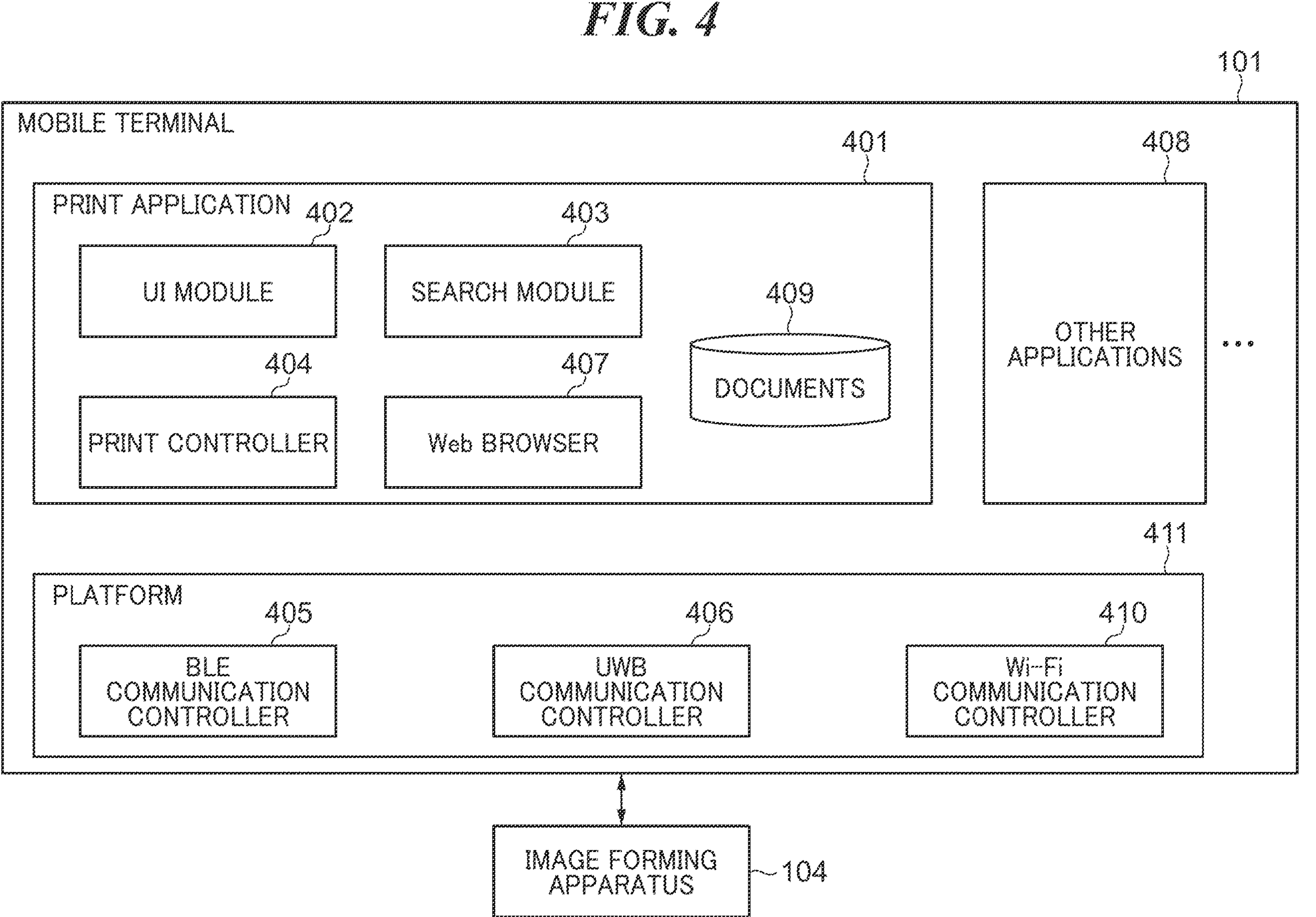
FIG. 4 is a block diagram for describing a configuration of software of the mobile terminal in FIG. 1 and a data area managed by the software.

FIG. 4 is a block diagram for describing a configuration of software of the mobile terminal 101 in FIG. 1 and a data area managed by the software. The software shown in FIG. 4 is controlled by the CPU 202 executing a program developed to the RAM 204.

As shown in FIG. 4, the mobile terminal 101 includes a print application 401, other applications 408, and a platform 411.

The print application 401 is one of the applications that the CPU 202 executes on the mobile terminal 101 in this embodiment, and is installed in the ROM 203 as an application that operates on the OS.

The platform 411 can be configured by, for example, Android (registered trademark) of Google LLC, iOS (registered trademark) of Apple Inc., or the like. The platform 411 includes a device driver group for controlling various kinds of hardware and provides an API for using various kinds of hardware to an application operating on the platform 411. Here, an API compliant with the CSML specification standardized by the FiRa consortium, which is a UWB promotion organization, is provided regarding the BLE communication and UWB communication. Here, CSML is an abbreviation for Common Service Management Layer. An API compliant with Nearby Interaction of Apple Inc. may be provided for the BLE communication and UWB communication. The device driver group includes a BLE communication controller 405, a UWB communication controller 406, and a Wi-Fi communication controller 410.

As shown in FIG. 4, the print application 401 includes a UI module 402, a search module 403, a print controller 404, a web browser 407, and a document 409.

The document 409 indicates a data area that is reserved in the RAM 204 and is managed by the software. The UI module 402 provides a user interface for allowing a user to set a unique function of the print application 401.

The search module 403 searches for a network device corresponding to a mDNS (multicast Domain Name System) on the LAN 103 in which the mobile terminal 101 participates. The search module 403 provides a function of searching for an image forming apparatus, which can be instructed to print by the mobile terminal 101 (i.e., which is supported by the print application 401), from among network devices reachable via the LAN 103 and of obtaining detailed information about the image forming apparatus searched for according to IPP/IPPS. Here, IPP is an abbreviation for Internet Printing Protocol. The communication method is not limited to mDNS or IPP.

Further, the search module 403 provides a function of searching for an image forming apparatus that can be instructed to print by the mobile terminal 101 in the WPAN in which the BLE communication by the BLE communication controller 405 is available. The search module 403 provides a function of controlling communication for distance measurement between the image forming apparatus searched for by the UWB communication controller 406 and the mobile terminal 101 to obtain distance information. Although a case where the image forming apparatus searched for is the image forming apparatus 104 will be described hereinafter, the same description can be applied to a case where the image forming apparatus 105 or 107 is searched for.

The print controller 404 provides a function of generating a print job for the image forming apparatus 104 and transmitting the print job as job data. The print application 401 may have not only the print instruction function but also a function of instructing the image forming apparatus 104 to scan.

Figure 5:
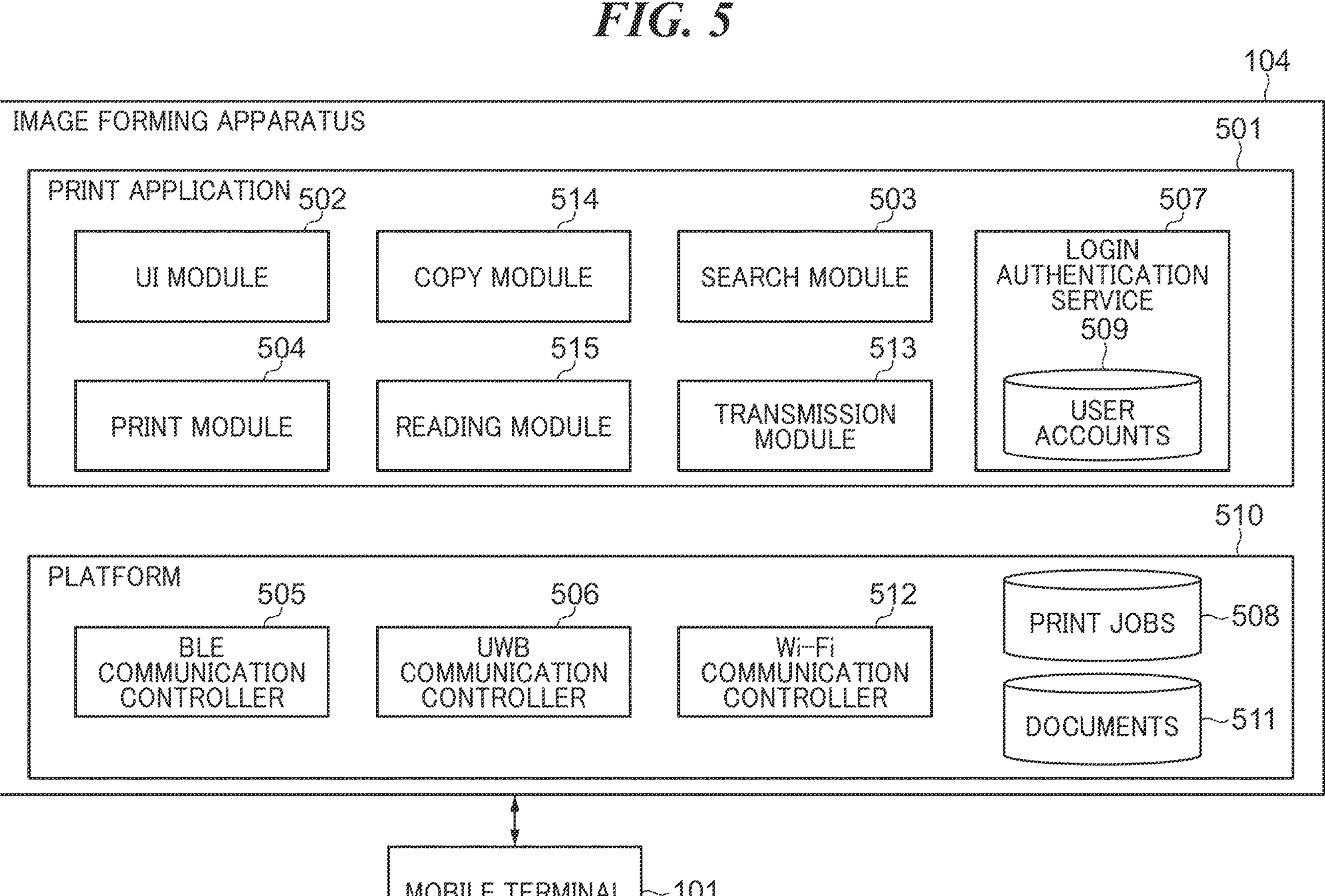
FIG. 5 is a block diagram for describing a configuration of software of the image forming apparatus in FIG. 1 and a data area managed by the software.

FIG. 5 is a block diagram for describing a configuration of software of the image forming apparatus 104 in FIG. 1 and a data area managed by the software. The software configuration of the image forming apparatuses 105 and 107 is also the same, and thus the description thereof will be omitted. The software shown in FIG. 5 is controlled by the CPU 1201 executing a program developed to the RAM 1202.

As shown in FIG. 5, the image forming apparatus 104 includes a print application 501, a login authentication service 507, and a platform 510.

The print application 501 is one of applications executed by the CPU 1201 of the image forming apparatus 104 and is installed in the ROM 1203 as an application operating on the OS.

In FIG. 5, a print job management area 508 and a document management area 511 in the platform 510 are secured in the RAM 1202 or the HDD 1204 and are managed by the software. Similarly, a user account management area 509 in the login authentication service 507 is also reserved in the RAM 1202 or the HDD 1204 and is managed by the software.

The platform 510 can be configured to include an OS like Linux (registered trademark), a virtual machine of JAVA (registered trademark), an OSGi (registered trademark) framework, and a device driver group. JAVA is a registered trademark of Oracle Corporation. The OSGi framework is a JAVA-based service platform defined by the OSGi Alliance (a standardization organization).

The platform 510 includes a device driver group for controlling various kinds of hardware and provides an API for using hardware to an application operating on the platform 510. The device driver group includes a BLE communication controller 505, a UWB communication controller 506, and a Wi-Fi communication controller 512.

For example, the BLE communication controller 505 is a device driver for controlling the BLE communication unit 1272. The Wi-Fi communication controller 512 is a device driver for controlling the Wi-Fi communication unit 1271.

The UWB communication controller 506 is a device driver for controlling the UWB communication unit 1273. An API compliant with the CSML specification standardized by the FiRa consortium is provided for protocol control using the BLE communication and UWB communication. An API compliant with Nearby Interaction of Apple Inc. may be provided for the BLE communication and UWB communication.

In addition, a printer module (not shown) for controlling the printer unit 20 and a scanner module (not shown) for controlling the scanner unit 10 are also installed in the platform 510. The platform 510 provides an API for reading and writing data in the print job management area 508 and the user account management area 509 to an application.

The login authentication service 507 is an application that provides a login function when a user uses the image forming apparatus 104.

As shown in FIG. 5, the print application 501 includes a UI module 502, a copy module 514, a search module 503, a print module 504, a reading module 515, and a transmission unit 513.

The copy module 514 controls the reading module 515 and the print module 504 via the platform 510 to execute copying. The print module 504 provides a function of printing document data stored in the document management area 511 and job data of a print job stored in the print job management area 508. The print module 504 provides a function of executing a print process of job data received from the mobile terminal 101. The print process may be a reservation print process for temporarily storing received job data and printing the data in response to an instruction received from a user. Further, the print process may a process for printing job data on the basis of distance information provided from the UWB communication controller 506.

The output of copying or printing by the copy module 514, the reading module 515, or the print module 504 is executed via the API of the platform 510, and the platform 510 records the number of printed sheets in a counter (not shown). The transmission module 513 provides a function of transmitting the document data obtained from the reading unit 515 to the outside. The UI module 502 provides a user interface like a menu screen for selecting a function unique to an application (for example, copy, print, or transmission) through the operation unit 140.

The search module 503 searches for a network device corresponding to mDNS on the LAN 103 in which the image forming apparatus 104 participates. The BLE communication controller 505, the UWB communication controller 506, the Wi-Fi communication controller 512, etc. are used for this search. The search module 503 provides a function of searching for an apparatus that can instruct the image forming apparatus 104 to print (i.e., an apparatus supported by the print application 501) from among network devices reachable via the LAN 103 or the Wi-Fi and of transmitting detailed information about the image forming apparatus to the apparatus searched for according to IPP/IPPS. The communication method is not limited to mDNS or IPP.

Further, the search module 503 provides a function of searching for an apparatus that can instruct the image forming apparatus 104 to print in the WPAN that enables the BLE communication by the BLE communication controller 505, the UWB communication by the UWB communication controller 506, or the Wi-Fi communication by the Wi-Fi communication controller 512. The search module 503 provides a function of obtaining distance information by the UWB communication controller 506 performing a process of specifying a communication partner for distance measuring a distance to the mobile terminal 101 and communication control.

Figure 6:
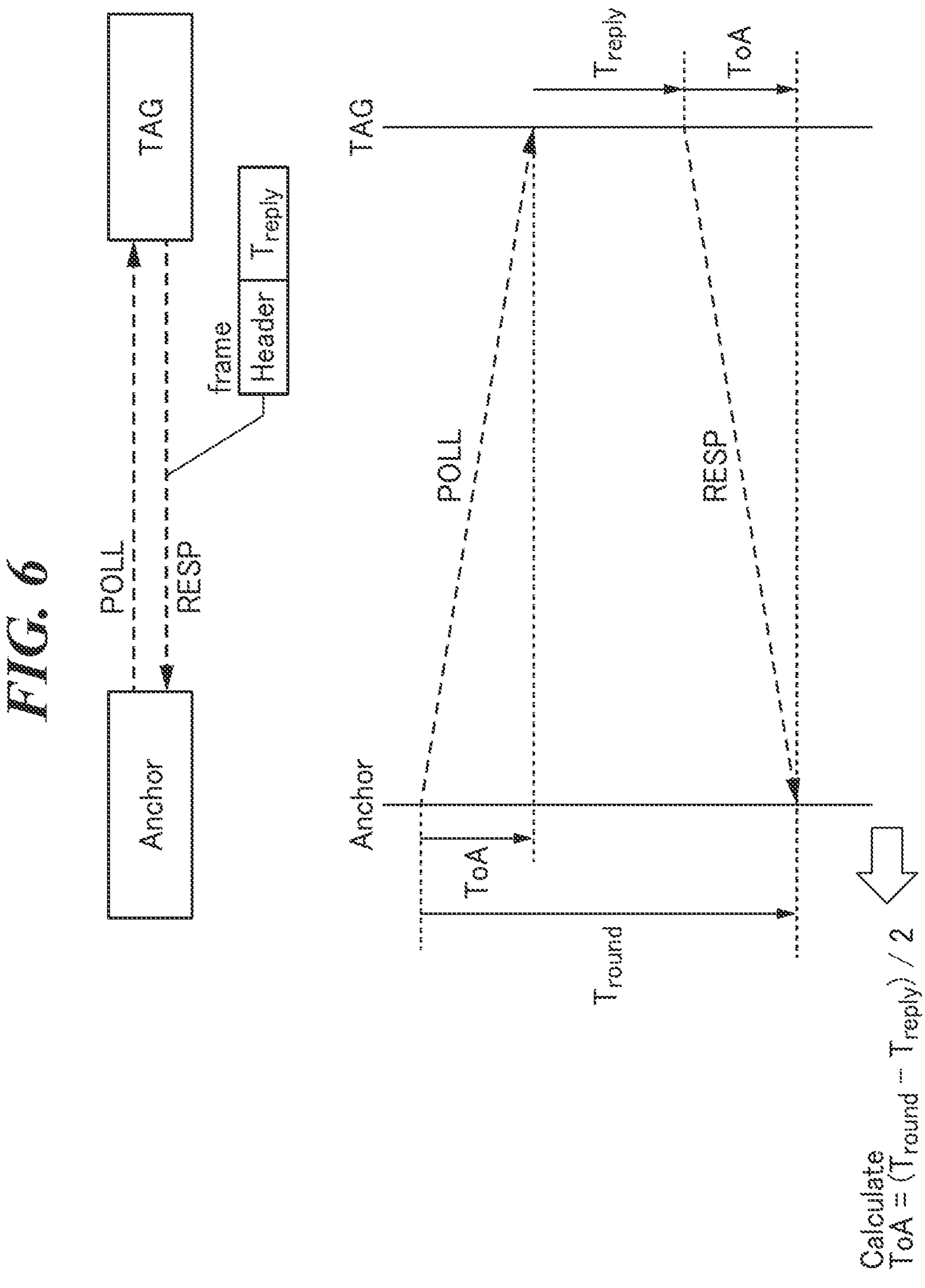
FIG. 6 is a view showing a UWB ranging method applied to the data processing system in FIG. 1.

FIG. 6 is a view showing a UWB ranging method applied to the data processing system 1 in FIG. 1. This ranging method measures a distance between TAG and Anchor, which is defined by the IEEE802.15.4 group. Specifically, the distance is measured by calculating time of arrival (ToA) per a unit distance based on the speed at which radio waves propagates in a space.

FIG. 6 shows the ranging method of a Two Way Ranging (TWR) in which frames are communicated in both directions between the Anchor and the TAG. In the TWR, the Anchor is a main constituent of the ranging and the TAG is a ranging target.

When ranging the distance to the TAG, the Anchor issues a POLL frame to the TAG. When the TAG that receives the POLL frame recognizes that the POLL frame is addressed to the TAG, the TAG transmits a RESP frame to the Anchor after a predetermined time ($T_{reply}$) has elapsed from the moment of reception. This RESP frame is assigned a $T_{reply}$ value.

The Anchor that received the RESP frame calculates the ToA required to convey the POLL frame and the RESP frame using the time ($T_{round}$) from the issuance of the POLL frame to the reception of the RESP frame and the $T_{reply}$ value included in the RESP frame. Finally, the Anchor calculates the distance to the TAG from the ToA and the propagation speed (speed of light) of the radio wave.

In the data processing system 1, the image forming apparatus 104 and the mobile terminal 101 include the respective UWB communication controllers that can support either roles of the TAG and the Anchor in the ranging method of the TWR described above. Specifically, there are the UWB communication unit 218 in FIG. 2, the UWB communication unit 1273 in FIG. 3, the UWB communication controller 406 in FIG. 4, and the UWB communication controller 506 in FIG. 5. The distance between the own apparatus and the ranging target can be mutually measured by the exchange of the frames and the calculation process described above in response to requests from applications (for example, the print applications 401 and 501 in FIG. 4 and FIG. 5).

Figure 7:
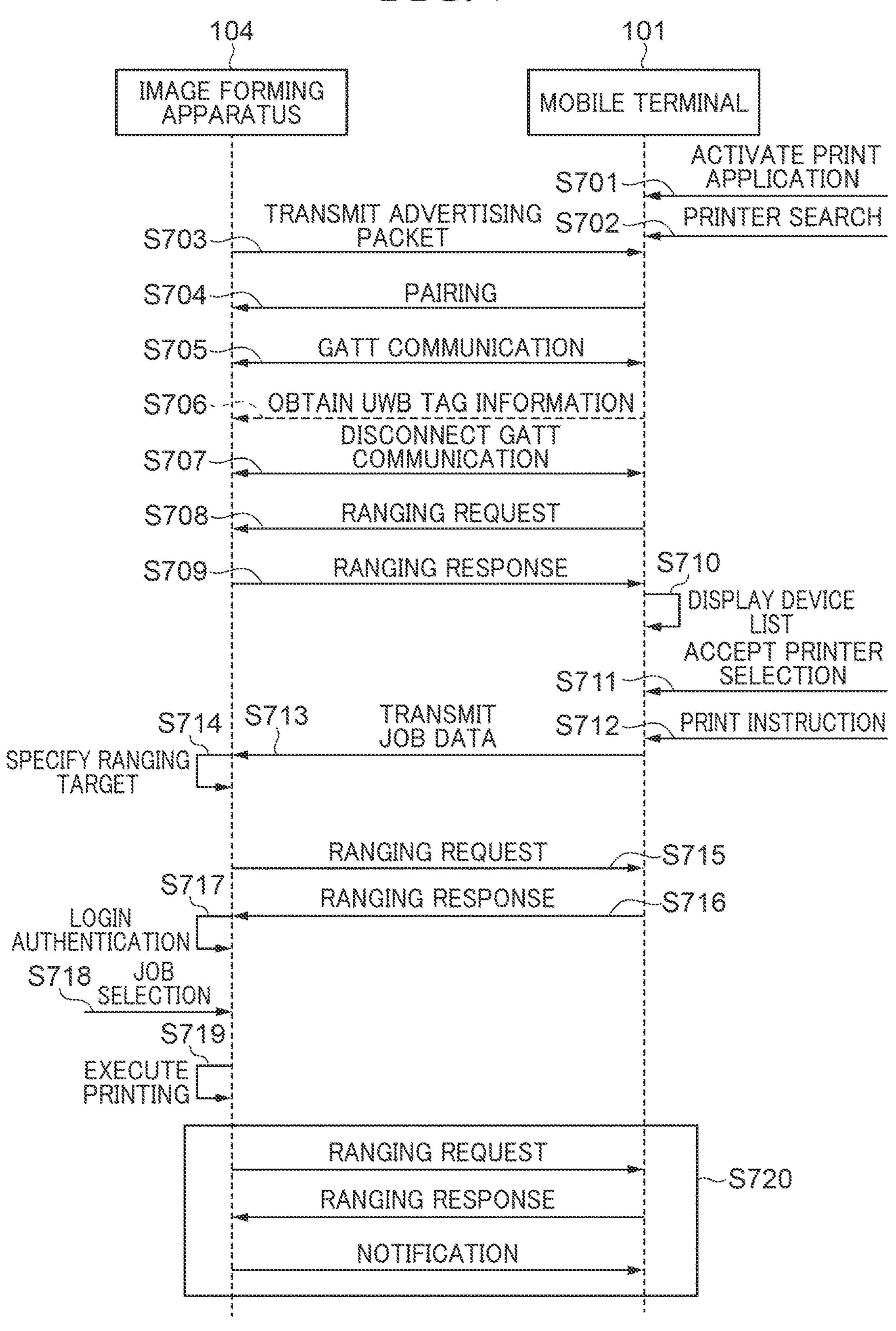
FIG. 7 is a sequence chart showing the entire operation process in the data processing system in this embodiment.

FIG. 7 is a sequence chart showing the entire operation process in the data processing system 1 in this embodiment.

In this process, first, a user who is logging in to the mobile terminal 101 operates the mobile terminal 101 to activate the print application 401 and instructs the mobile terminal 101 to search for an image forming apparatus.

When receiving this instruction, the mobile terminal 101 searches for an image forming apparatus that is transmitting the advertising packet and displays the searched image forming apparatus on a printer search screen in FIG. 8D described later so that the user can select.

When the user selects the image forming apparatus 104 from among image forming apparatuses displayed on the printer search screen, the mobile terminal 101 transmits job data of a print job to the image forming apparatus 104. Thereafter, the mobile terminal 101 and the image forming apparatus 104 communicate with each other and operate in cooperation with each other until the image forming apparatus 104 completes the print operation about the received job data.

Operations of the mobile terminal 101 and the image forming apparatus 104, which are features of the present invention, will be described with reference to this sequence chart. In this embodiment, when the user selects any one of the image forming apparatuses 105 to 107 from among the image forming apparatuses displayed on the printer search screen, the selected image forming apparatus executes the same operation as the operation of the image forming apparatus 104 described below.

An operation flow shown in the sequence chart in FIG. 7 is achieved by the hardware components and the software components constituting the mobile terminal 101 and the image forming apparatus 104 shown in FIG. 2 to FIG. 5 described above. In the mobile terminal 101, the software components are operated by the CPU 202 executing programs developed on the RAM 204. In the image forming apparatus 104, the software components are operated by the CPU 1201 executing programs developed on the RAM 1202.

Figure 8A:
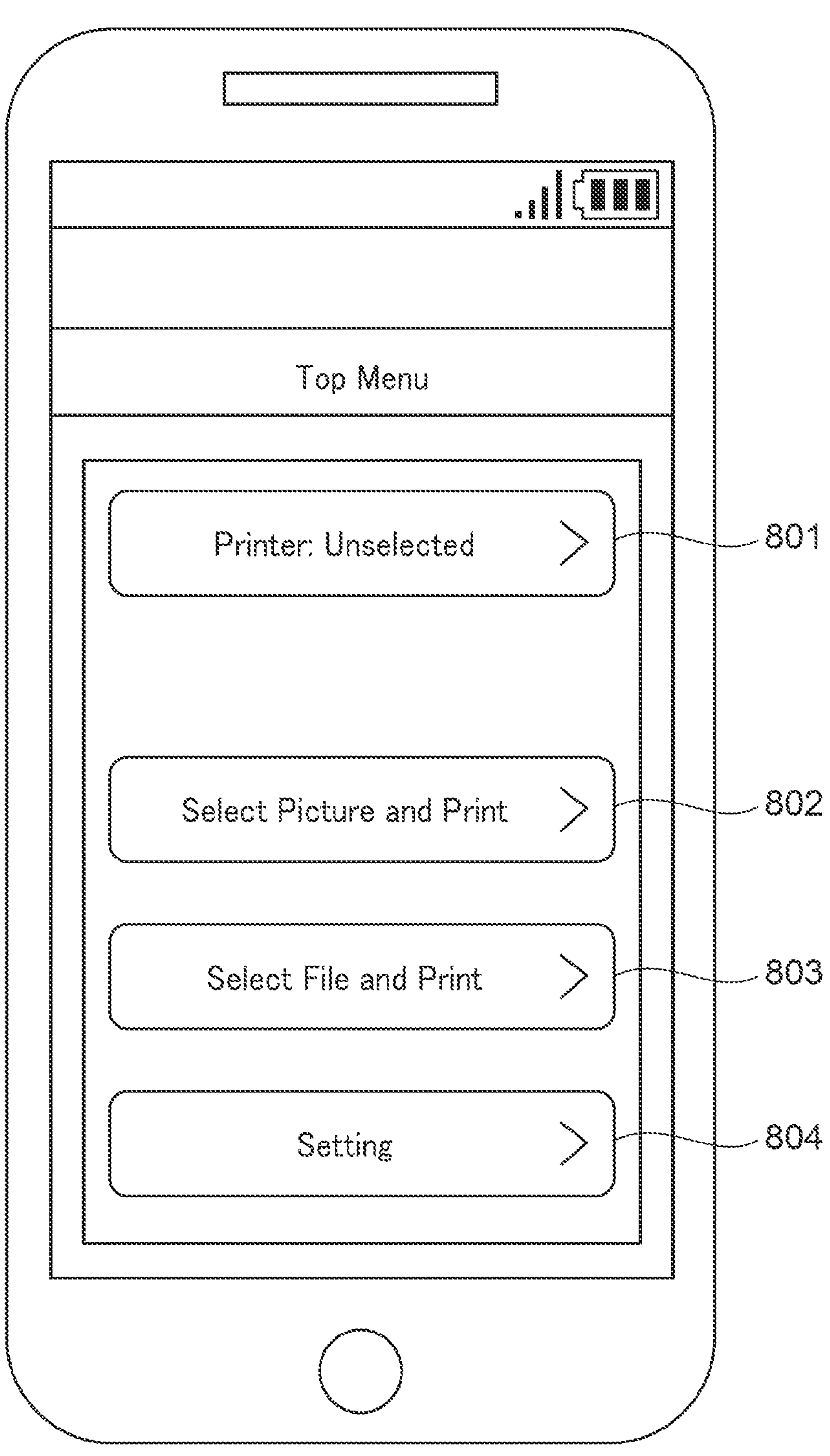
FIG. 8A is a view showing an example of a top menu screen of the mobile terminal.

First, when the mobile terminal 101 receives a predetermined operation from the user, the CPU 202 activates the print application 401 (step S701). FIG. 8A shows a top menu displayed immediately after the print application 401 is activated.

The top menu screen in FIG. 8A is a user interface that accepts various input operations from the user and includes buttons 801, 802, 803, and 804.

The button 801 is used for shifting to a screen for selecting an image forming apparatus to be a print instruction target. When no image forming apparatus has been selected, a message indicating that no image forming apparatus (printer) has been selected is displayed on the button 801 as shown in FIG. 8A.

The button 802 is used for shifting to a screen for selecting and printing a photo saved in the mobile terminal 101. When no image forming apparatus to be a print instruction target has been selected, the button 802 is disabled even if pressed.

The button 803 is used for sifting to a screen for selecting and printing a file like a PDF file saved in the mobile terminal 101. When no image forming apparatus to be a print instruction target has been selected, the button 803 is disabled even if pressed, similarly to the button 802.

Figure 8B:
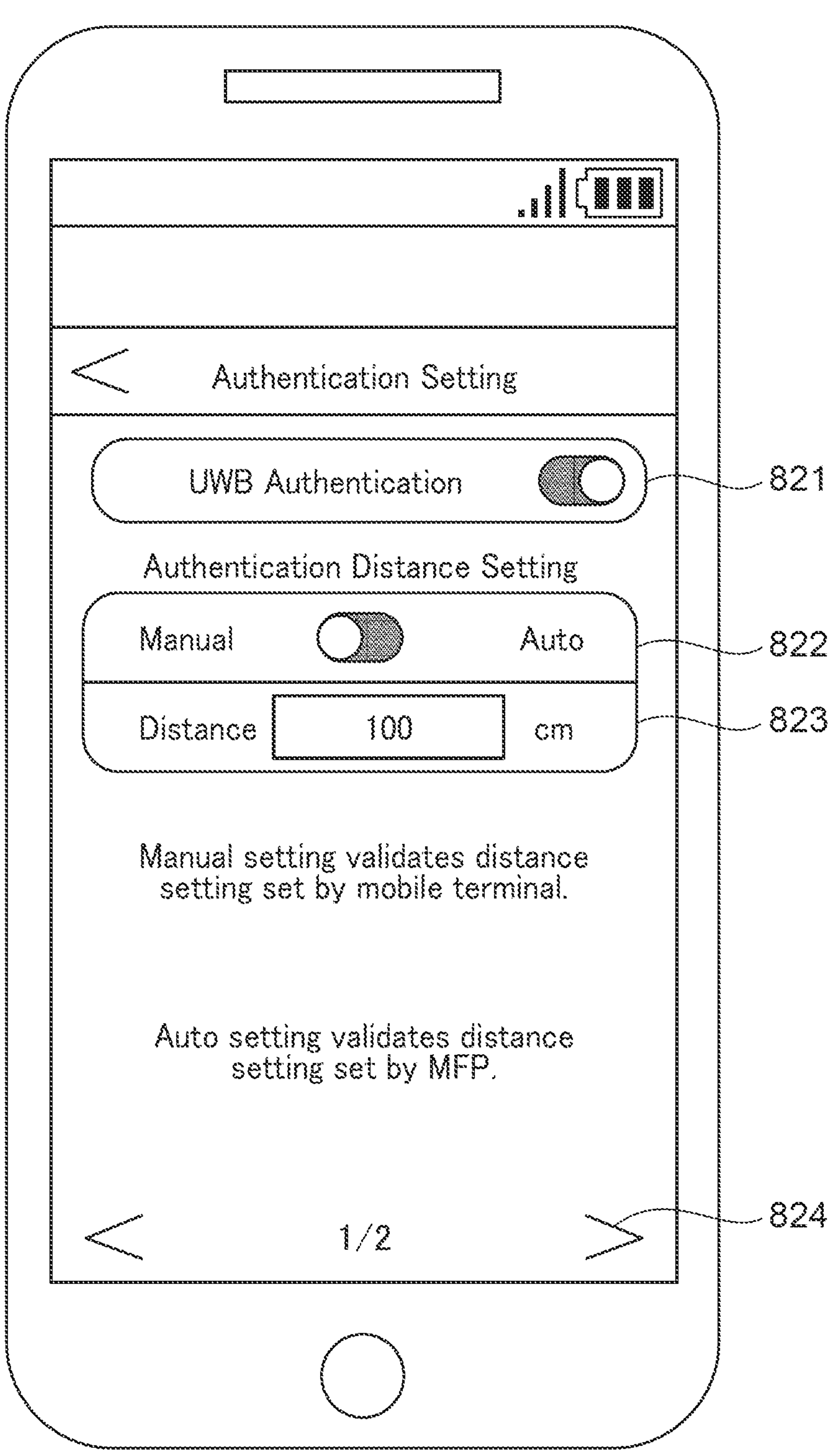
FIG. 8B is a view showing an example of a UWB authentication setting screen of the mobile terminal.
Figure 8C:
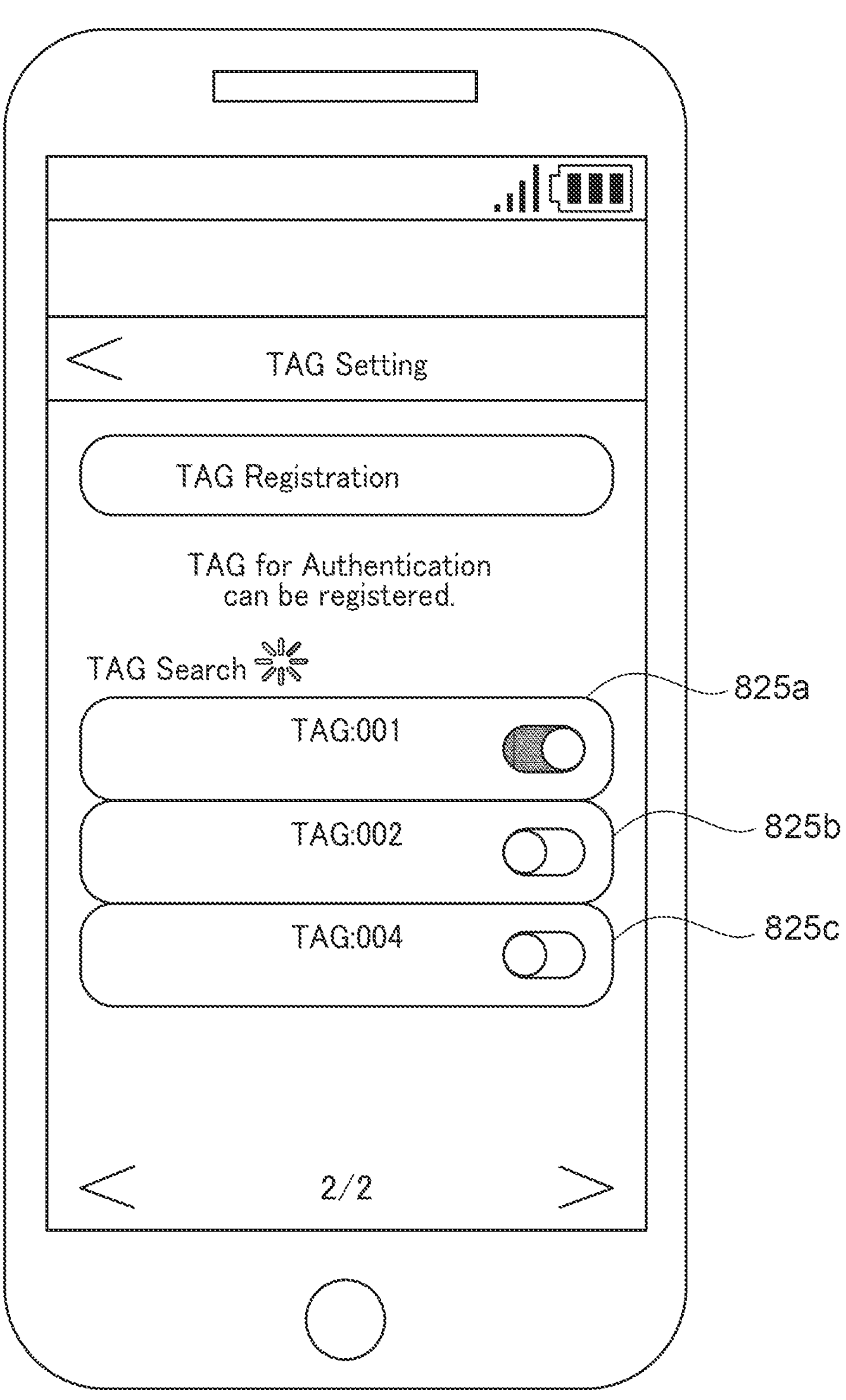
FIG. 8C is a view showing an example of a TAG setting screen of the mobile terminal.

The button 804 is used for sifting to a UWB authentication setting screen (FIG. 8B) or a TAG setting screen (FIG. 8C). The UWB authentication setting screen is used for setting UWB authentication necessary for measuring a distance from the image forming apparatus that is the print instruction target or for authentication based on the distance measurement. The TAG setting screen is used for registering arbitrary UWB TAG information.

As shown in FIG. 8B, the UWB authentication setting screen includes toggle buttons 821 and 822, an authentication distance entry field 823, and a screen switching button 824.

The toggle button 821 accepts selection of whether to authenticate by UWB ranging. The toggle button 822 accepts whether to select automatic setting or manual setting of a distance condition in the authentication by the UWB ranging. The authentication distance entry field 823 accepts an entry of a threshold X used for distance determination described later, when the manual setting is selected by the toggle button 822. As described above, the mobile terminal 101 can display the UWB authentication setting screen that is a user interface for entering the distance condition. Therefore, in this embodiment, practical access control is available according to the positional relationship between the installation location of the image forming apparatus 104 and the traffic line of the user carrying the UWB TAG (the mobile terminal 101 or the like) that is the ranging target.

When the user presses the screen switching button 824, the screen is shifted from the UWB authentication setting screen (FIG. 8B) to the TAG setting screen (FIG. 8C).

As shown in FIG. 8C, the TAG setting screen is an entry reception screen for registering an arbitrary UWB TAG in a TAG for authentication and includes toggle button 825*a*, 825*b*, and 825*c*. The arbitrary UWB TAG is a device capable of performing wireless communication as a UWB TAG, such as AirTag (registered trademark) of Apple Inc., and may be a communication device generally including a power supply like a battery, a UWB communication unit, a BLE communication unit, a storage unit, and a control IC like a microcomputer. In this embodiment, the arbitrary number of UWB TAGs independent of the mobile terminal 101 can be registered.

It should be noted that an arbitrary UWB TAG can be registered by a general method. Specifically, a UWB TAG is registered by receiving UWB TAG information by the GATT communication after pairing by the BLE communication. Further, an arbitrary name can be entered in registration.

As shown in FIG. 8C, the TAG setting screen includes registration toggle buttons 825*a*, 825*b*, and 825*c* in which names are displayed for the respective searched UWB TAGs. In FIG. 8C, the toggle button 825*a* about the UWB TAG named TAG:001 is turned on by the user and this USB TAG is registered for authentication. The image forming apparatus 104 can handle not only the mobile terminal 101 but also any registered UWB TAGs as the ranging target by the UWB communication.

Referring back to FIG. 7, when the user presses the button 801 on the top menu screen (FIG. 8A) in the mobile terminal 101, the CPU 202 starts searching for an image forming apparatus as a candidate for a print instruction target (step S702). At the same time as the start of the search, the display is switched from the top menu screen to the printer search screen (FIG. 8D) that sequentially displays searched image forming apparatuses.

In this embodiment, all of the image forming apparatuses 104 to 107 in the data processing system 1 are searched for. However, the image forming apparatus 106 does not have the UWB communication function as described above, and therefore, only the exchange between the mobile terminal 101 and the image forming apparatuses 104, 105, and 107 among the searched image forming apparatuses will be described below.

When the search in the step S702 starts, first, the CPU 202 receives advertising packets transmitted by the image forming apparatuses 104, 105, and 107 in the data processing system 1 shown in FIG. 1 (step S703). Next, the CPU 202 pairs the mobile terminal 101 with the image forming apparatuses 104, 105, and 107 to establish authentication connections for data communication between them (step S704).

Next, information necessary for the print application is exchanged between the mobile terminal 101 and the image forming apparatuses 104, 105, and 107 by the GATT communication (step S705). The information exchanged includes data structures of the image forming apparatuses 104, 105, and 107 as BLE devices and operation method thereof, which are defined as a profile.

In this embodiment, the UWB TAG information unique to the UWB communication unit 1273 included in each of the image forming apparatuses 104, 105, and 107 and the UWB TAG information unique to the UWB communication unit 218 included in the mobile terminal 101 are also exchanged in the GATT communication.

In this embodiment, communication capability messages 910 described later are exchanged between the mobile terminal 101 and the image forming apparatuses 104, 105, and 107 in the GATT communication in the step S705. It should be noted that the UWB TAG information of the image forming apparatuses 104, 105, and 107 and the communication capability message 910 may be added to the advertising packet.

That is, the communication setting information in the UWB communication is exchanged between the mobile terminal 101 and the image forming apparatuses 104, 105, and 107 by using the BLE communication in the process in the steps S703 to S705. The communication setting information in the UWB communication to be exchanged includes at least address information of a packet transmission destination included in the UWB TAG information, information about a role of the UWB communication and information about the ranging method that are included in the communication capability message 910.

In addition, at least a model name as a profile component of an image forming apparatus as a basic role and an IP address as a profile component of a communication apparatus using a network like WiFi are obtained in the process in the steps S703 to S705. These pieces of information are displayed in a device list 811 of the printer search screen (FIG. 8D) as the respective pieces of apparatus information of the image forming apparatuses 104, 105, and 107 in step S710 described below.

Figure 9A:
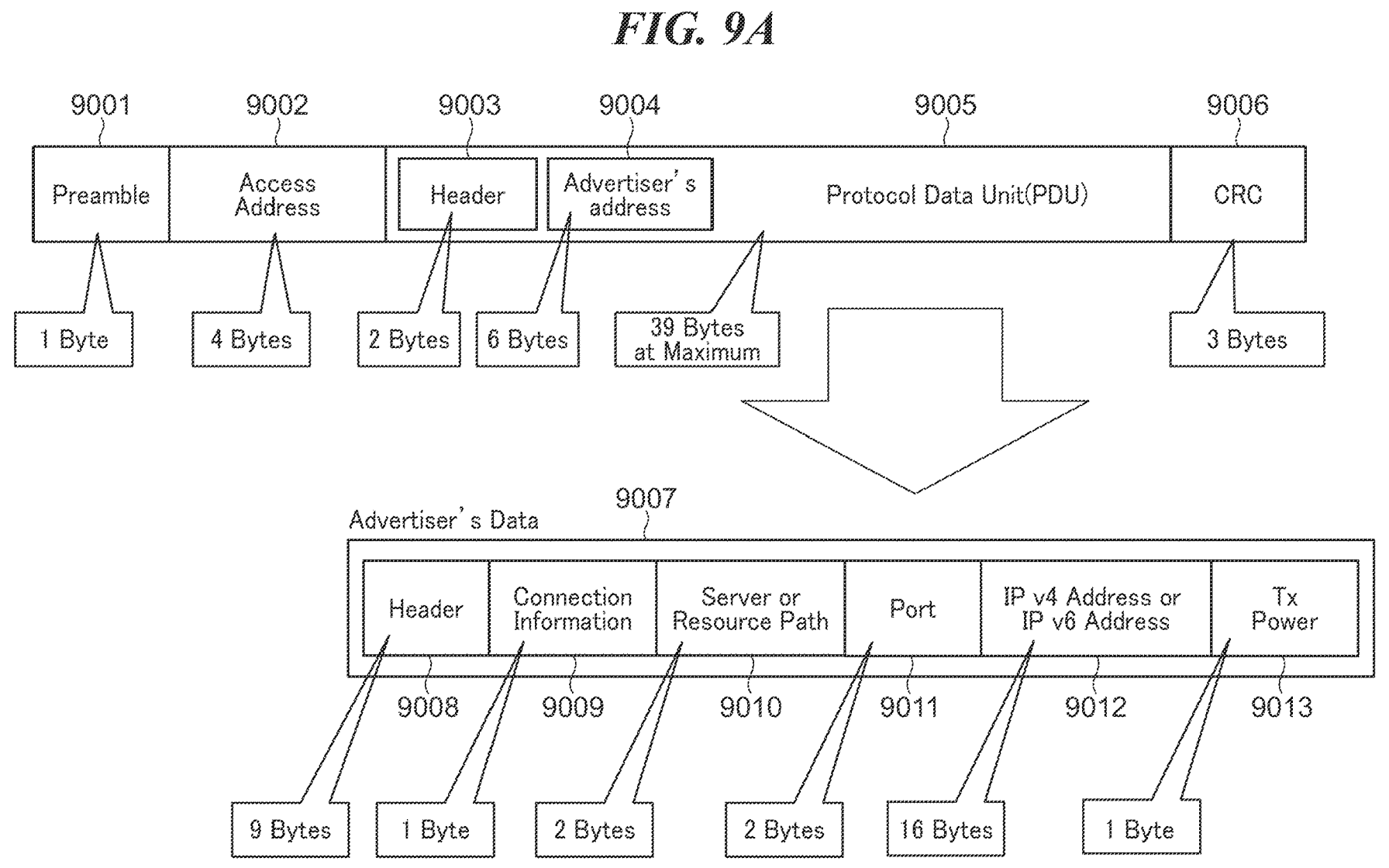
Figure 9B:
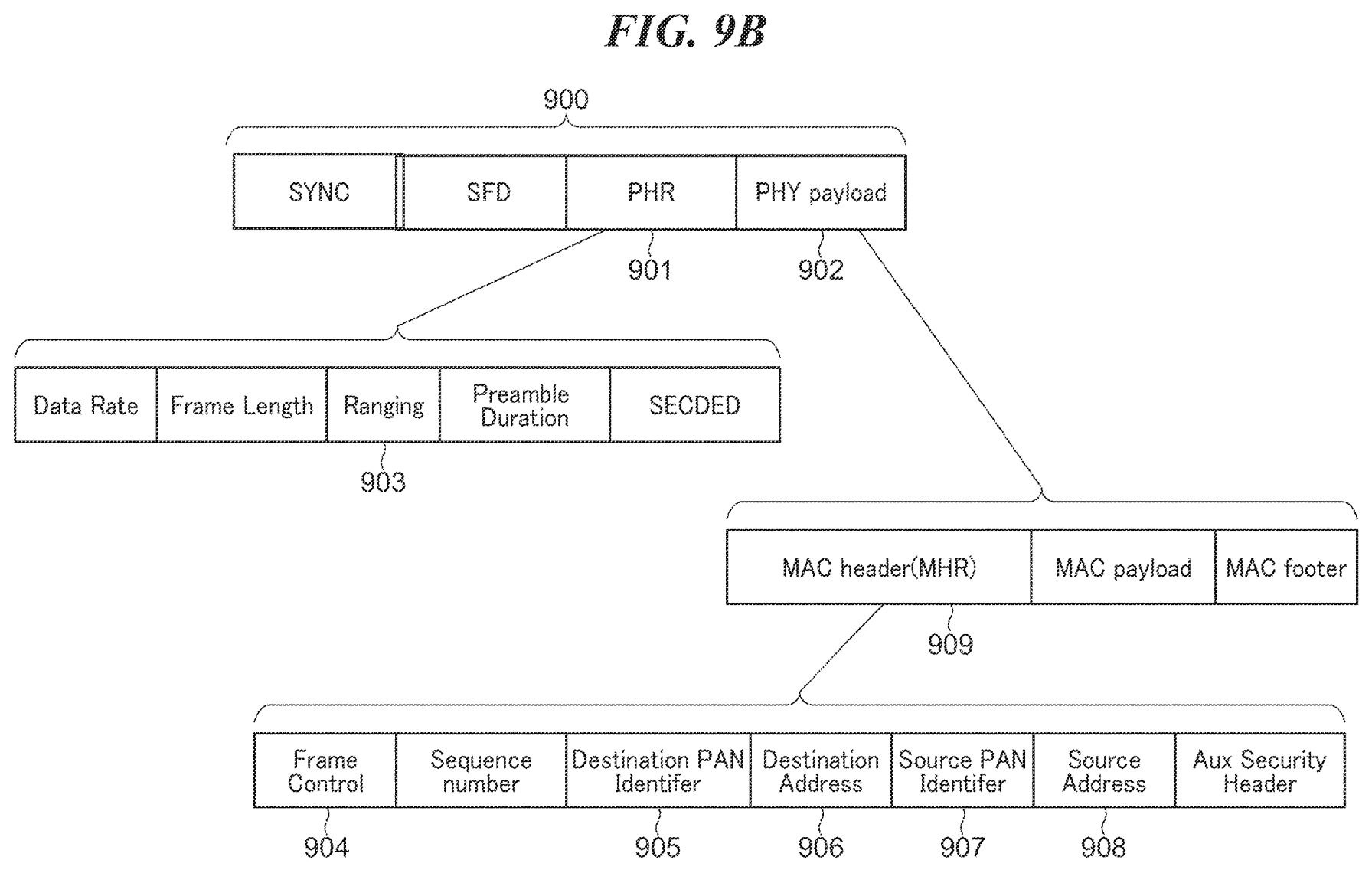
Figure 9C:
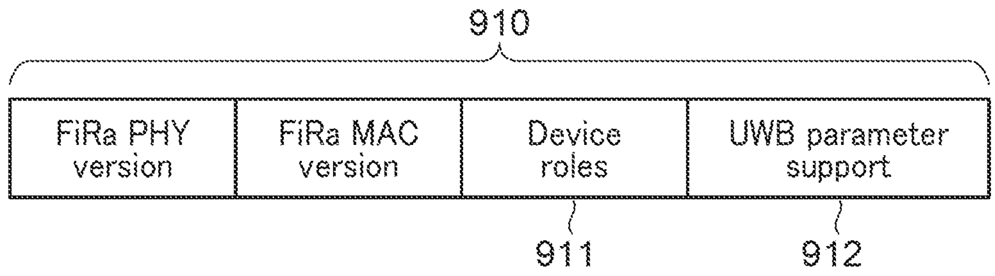
FIG. 9C is a view showing specification of a communication capability message in a FiRa-defined communication protocol definition (CSML, Common Service & Management Layer) applicable with the UWB ranging in the data processing system.
Figure 9D:
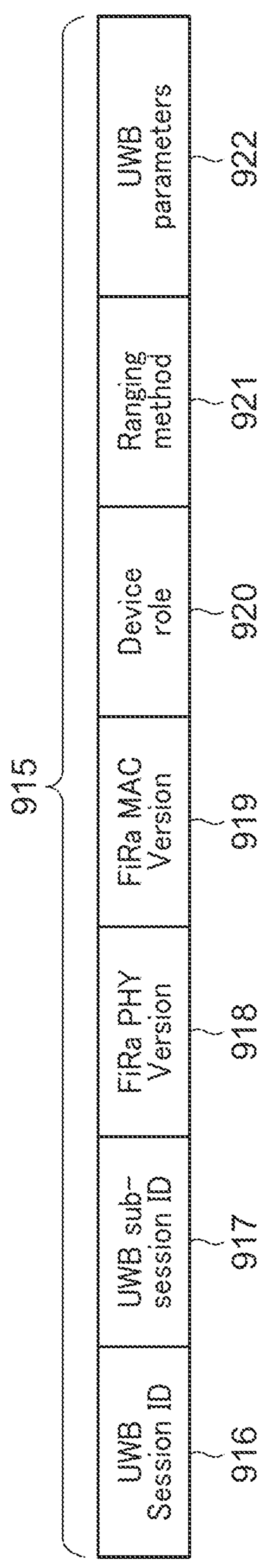
FIG. 9D is a view showing specification of a communication configuration message in the FiRa-defined communication protocol definition (CSML) applicable with the UWB ranging in the data processing system.

The configuration of the UWB TAG information will now be described. The UWB TAG information is constituted by at least a PAN ID, addresses of a packet source and a packet destination, and IEEE802 compliant addresses uniquely assigned to the wireless terminals to be uniquely identified. Here, the PAN ID is an abbreviation of Personal Area Network ID and is an ID for identifying a partner of the UWB communication defined in IEEE802.15.4z. Further, the information may include information indicating a UWB communication compatible device in a broad sense. Furthermore, the GATT communication profile may include communication capability information and communication setting information necessary for the UWB communication as shown in FIG. 9B to FIG. 9D.

It should be noted that a communication protocol between the mobile terminals 101 and the image forming apparatus 104 is based on the CSML of the FiRa consortium defined under the regulation of the IEEE802.15.4. Alternatively, the communication protocol between the mobile terminals 101 and the image forming apparatus 104 may be the Nearby Interaction Protocol of Apple Inc. In these communication protocol specifications, the UWB TAG information is used for identifying a communication partner in the UWB communication.

In these standards, energy consumption of a UWB wireless chip is higher than that of other wireless standards. Therefore, these standards are common in that information necessary for the UWB communication is exchanged through a secondary channel prior to the UWB communication in order to detect a nearby UWB device. The necessary information includes a capability and settings of the UWB communication and data necessary between applications. As in this embodiment, the BLE communication is used as the secondary channel in many cases.

Next, a configuration of a BLE advertising packet transmitted from each of the image forming apparatuses 104, 105, and 107 will be described. FIG. 9A is a view showing the configuration of the BLE advertising packet transmitted from each of the image forming apparatuses 104, 105, and 107 having the UWB communication function in FIG. 1.

Although there are a plurality of formats of the BLE advertising packet transmitted by the image forming apparatuses 104, 105, and 107, an advertising packet in the AirPrint Bluetooth Beacon format provided by Apple Inc. will be described hereinafter. The BLE advertising packet is wireless beacon data that is broadcasted as what is called a beacon signal and is transmitted at intervals of several milliseconds to several seconds.

First, at the head of the BLE advertising packet, a preamble 9001 for a BLE wireless element to use for a signal reading timing is configured in 1 byte. Next, an access address 9002 in which a value indicating that the packet is a BLE advertising packet is inserted is configured in 4 bytes. Next, a PDU (Protocol Data Unit) 9005 is configured as a real-data area in 39 bytes at the maximum. In the meantime, since the PDU 9005 is consumed as 2 bytes as a header 9003 and 6 bytes as an advertiser's address 9004, the remaining 31 bytes constitutes advertiser's data 9007.

The format of the AirPrint Bluetooth Beacon as an example of the advertiser's data 9007 is described with reference to FIG. 9A. First, a header 9008 that is a common value of the AirPrint Bluetooth Beacon is configured in 9 bytes. Next, a connection information 9009 indicating the format of the IP address and whether the apparatus that is transmitting the advertising packet is a printer or a print server is configured in 1 byte. Next, a server or resource path 9010 indicating identification information about a printer determined by a server is configured in 2 bytes. Next, a port 9011 indicating a port number is configured in 2 bytes. Next, an IP address (IP v4 address or IP v6 address) 9012 is configured in 16 bytes. Finally, a Tx power 9013 indicating signal intensity of the beacon emitted is configured in 1 byte. At the end of the BLE advertising packet, a CRC 9006 for detecting a code error is configured in 3 bytes. The advertising packet is configured as a whole as described above.

The example of the advertising packet has been described above. As described above, since the BLE communication is used as the secondary channel for the necessary information exchange prior to the UWB communication, for example, the UWB TAG information and the UWB communication setting information may be included in the advertising packet.

Next, the communication capability message 910 will be described. FIG. 9C is a view showing specification of the communication capability message 910 in the FiRa-defined communication protocol definition (CSML) applicable to the UWB ranging in the data processing system 1. The communication capability message 910 is a communication message in a network layer and a transport layer of a communication protocol stack. Information related to compatibility and communication capability between FiRa devices are exchanged through a communication channel of another band such as BLE or NFC. In this embodiment, the communication capability message 910 is exchanged by the GATT communication in the step S705.

The BLE communication controllers 405 and 505 (FIG. 4 and FIG. 5) are components of the mobile terminal 101 and the image forming apparatus 104, and each implements a communication protocol stack as a part of an API called from a higher-level application to process the communication capability message 910.

The communication capability message 910 includes a FiRa PHY version in a physical layer and a FiRa MAC version in a MAC layer as the FiRa-defined interfaces.

Further, the communication capability message 910 includes device roles 911 and UWB parameter support 912.

The device roles 911 identify roles in the UWB communication, i.e., determine whether the function of Anchor that is the main constituent of the ranging is supported or the function of TAG that is the ranging target is supported. The UWB parameter support 912 includes settings related to the supported ranging like ranging methods.

The image forming apparatus 104 and the mobile terminal 101 support both an Anchor mode and a TAG mode as the device roles 911. The image forming apparatus 104 and the mobile terminal 101 support at least the TWR (Tow Way Ranging) as the ranging methods.

The communication configuration message 915 will now be described. FIG. 9D is a view showing specification of the communication configuration message 915 in the FiRa-defined communication protocol definition (CSML) applicable to the UWB ranging in the data processing system 1. The UWB communication settings in the communication configuration message 915 are determined on the basis of the exchange of the communication capability messages 910 described above. For example, the roles of the image forming apparatus 104 and the mobile terminal 101 and the ranging methods in the UWB communication are determined as the UWB communication settings. The communication configuration messages 915 including these pieces of setting information are exchanged between the image forming apparatus 104 and the mobile terminal 101.

In determining the UWB communication settings, negotiation (hereinafter referred to as "arbitration") between the FiRa devices of the image forming apparatus 104 and the mobile terminal 101 is performed as shown in the sequence chart in FIG. 7.

In the data processing system 1, the roles of the Anchor and the TAG as the UWB devices are arbitrated on the basis of the requests of the applications of the mobile terminal 101 and the image forming apparatus 104. The communication configuration message 915 includes the field of device role 920 indicating the roles determined by the arbitration.

Specifically, first, the search module 503 of the print application 501 of the image forming apparatus 104 issues a ranging request to the ranging target on the basis of the information about the ranging target added to the print job by the print controller 404 of the print application 401 of the mobile terminal 101. When the ranging target is the mobile terminal 101, the above-described arbitration is started between the image forming apparatus 104 and the mobile terminal 101 in response to the ranging request, and the roles as the UWB devices are arbitrated between the UWB communication controllers 406 and 506 in the respective platforms.

The image forming apparatus 104 that has received the print job exchanges the communication configuration messages 915 to set the role of the image forming apparatus 101 itself to the Anchor so as to be the main constituent (a radio wave transmission source) of the ranging, changes the role from the TAG to the Anchor, and then performs the ranging.

In the data processing system 1, the roles can be switched by the arbitration so that the ranging can be performed in both directions during the mobile print process. In the process until which the mobile terminal 101 searches for devices, performs the ranging, and displays the device list, the roles of the mobile terminal 101 and the image forming apparatus 104 are arbitrated as the Anchor and the TAG, respectively. Thereafter, when the user issues a print job, the roles are arbitrated again, the role of the image forming apparatus 104 is changed to the Anchor, the role of the mobile terminal 101 is changed to the TAG, and the ranging is started.

The communication configuration message 915 also includes a field of UWB Session ID 916 for holding a value of a session ID that is issued for each user. The session ID is used for identifying a target of the UWB communication process as a session including a plurality of print jobs of the same user. Even when a plurality of users are using a connection partner device, the image forming apparatus 104 can individually identify each user by referring to the fields of the device role 920 and UWB Session ID 916.

Referring back to FIG. 7, when receiving the UWB TAG information about the mobile terminal 101 by the GATT communication (step S706), the image forming apparatus 104 determines that the mobile terminal 101 supports the UWB communication and disconnects the GATT communication (step S707). The image forming apparatus 104 switches the communication with the mobile terminal 101 from the GATT communication of the BLE to the UWB communication.

As described above, in this embodiment, when obtaining the UWB TAG information by the BLE communication, the image forming apparatus 104 disconnects the communication connection with the mobile terminal 101 by the BLE communication and establishes the communication connection by the UWB communication. It should be noted that the image forming apparatus 104 can communicate with a plurality of communication apparatuses in parallel (what is called one-to-multiple communication) by the UWB communication. In the meantime, the image forming apparatus 104 can communicate with only one communication apparatus (what is called one-to-one communication) by the GATT communication of the BLE.

Next, the CPU 202 of the mobile terminal 101 transmits a ranging request packet to the image forming apparatus 104 by the UWB communication (step S708). The CPU 202 transmits the ranging request packet on the basis of the UWB communication setting determined through the exchange of the communication capability message 910 and the communication configuration message 915 by the BLE and the above-described UWB TAG information transmitted from the image forming apparatus 104.

It should be noted that the ranging request packet is a packet in a format required for performing the TWR defined in the IEEE802.15.4z shown in FIG. 6. The ranging request packet includes at least ranging request identification information, request source address information, request destination address information, and an IEEE802 compliant address.

Next, the image forming apparatus 104 that has received the ranging request packet transmits a ranging response packet to the mobile terminal 101 after a predetermined time elapses (step S709). The mobile terminal 101 that has received the ranging response packet finds a distance according to the TWR method shown in FIG. 6.

FIG. 9B is a view showing packet specification used for the UWB ranging in the data processing system 1. The specification of the packet related to the UWB ranging is defined as a structure of a UWB frame 900 in the physical layer and data link layer (MAC) in a general communication protocol stack.

The UWB frame 900 is configured from the following fields: a SYNC field that holds a preamble for synchronization between the transmission device and the reception device; an SFD field that holds a value indicating a boundary between the preamble and a PHY header; a PHR field 901; and a PHY payload field 902.

The PHR 901 is a field that holds the PHY header. The PHY payload 902 is a field that holds PHY payload.

The PHR 901 further includes a field of ranging 903 holding a flag identifying whether the frame is issued for the ranging. For example, the UWB communication controller 406 or 506 (FIG. 4 or FIG. 5) sets the flag in the ranging 903 of the frame structure of a ranging request packet transmitted by the mobile terminal 101 or the image forming apparatus 104 to perform the ranging to "1".

The PHY payload 902 includes an MHR 909, a MAC payload, and a MAC footer as shown in FIG. 9B.

The "MHR" 909 is a field that holds a MAC header and includes fields 904 to 908 as shown in FIG. 9B.

The field 904 is a frame control field that indicates a frame format used for controlling the frame in the data link layer (MAC). The field 905 is a destination PAN ID field that indicates a PAN ID of a packet transmission destination. The field 906 is a destination address field that indicates an address of a packet transmission destination.

The field 907 is a Source PAN Identifier field that indicates a PAN ID of a packet transmission source. The field 908 is a Source Address field that indicates an address of a packet transmission source.

The UWB communication controllers 406 and 506 (see FIG. 4 and FIG. 5) set information unique to the devices, such as the PAN ID and the address information, to these fields 904 to 908. In the mobile terminal 101 in the data processing system 1, the PAN ID and the address information obtained from the image forming apparatus selected on the printer search screen (FIG. 8D) described below are set in the fields 905 and 906.

At this time, the UWB communication controller 506 of the image forming apparatus 104 analyzes the ranging field 903 and the fields 905 to 908 indicating the PAN IDs and addresses of the transmission source and transmission destination of the packet of the frame constituting the received ranging request packet. The UWB communication controller 506 generates a frame to which time information required for analysis of the frame, a response process, etc. and transmits the ranging response packet including the generated frame to the mobile terminal 101.

Figure 8D:
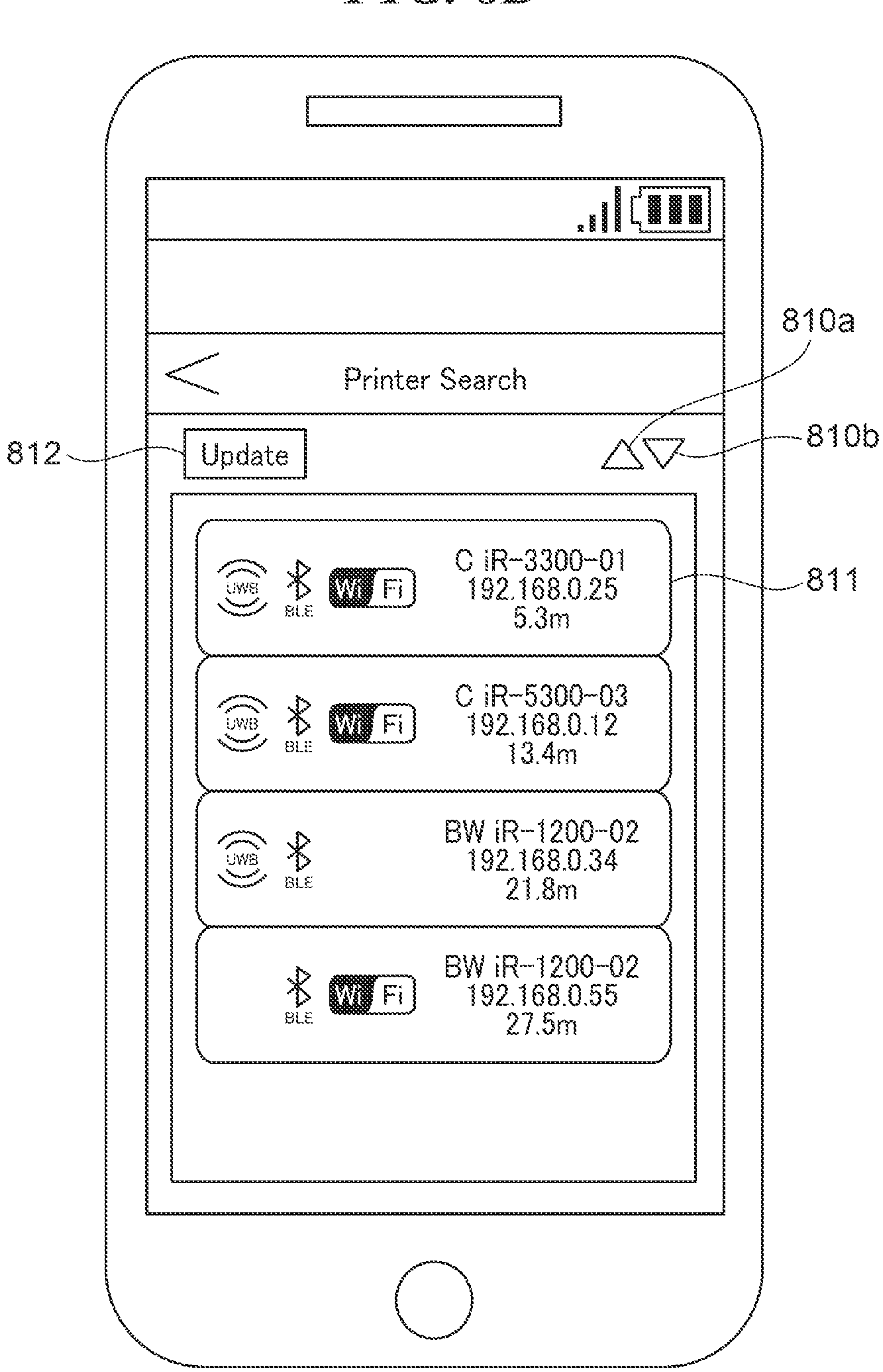
FIG. 8D is a view showing an example of a printer search screen of the mobile terminal.

Referring back to FIG. 7, the CPU 202 of the mobile terminal 101 displays a list of the device information of the searched image forming apparatus group in the device list 811 on the printer search screen as shown in FIG. 8D (step S710). The device information displayed here includes distance information calculated on the basis of the ranging response packet received from each of the searched image forming apparatuses.

The printer search screen has an update button 812 as shown in FIG. 8D. When the update button 812 is pressed, the CPU 202 re-executes the steps S703 to S709. This allows the user to confirm a change in the status of the searched image forming apparatus group.

The mobile terminal 101 also includes buttons 810*a* and 810*b* that are user interfaces for setting search frequency of periodic update that automatically updates the display screen of the device list 811. Specifically, the user can increase the search frequency by pressing the button 810*a* formed of an upward triangular mark and can decrease the search frequency by pressing the button 810*b* formed of a downward triangular mark.

FIG. 8D shows an example of contents of the device list 811 indicating the apparatus information about the searched image forming apparatus group on the printer search screen. As the device information of each of the searched image forming apparatuses, a model name, an IP address, calculated distance information, and a communication interface type icon are displayed.

For example, the device information about the image forming apparatus 104 is displayed at the top of the device list 811. In particular, "C iR-3300-01" is displayed as the model name, "192.168.0.25" is displayed as the IP addresses, and "5.3 m" is displayed as the calculated distance information. Icons of UWB, BLE, and Wi-Fi are displayed as type icons of the communication interfaces.

The printer search screen is not limited to the configuration shown in FIG. 8D as long as the user can determine the attributes necessary for selecting an image forming apparatus to which a print job is input (an apparatus serving as a data transmission destination candidate) from the device list 811. The user can set in advance the attributes necessary for selecting the image forming apparatus to which the print job is input on the search condition setting screen (FIG. 8E).

Figure 8E:
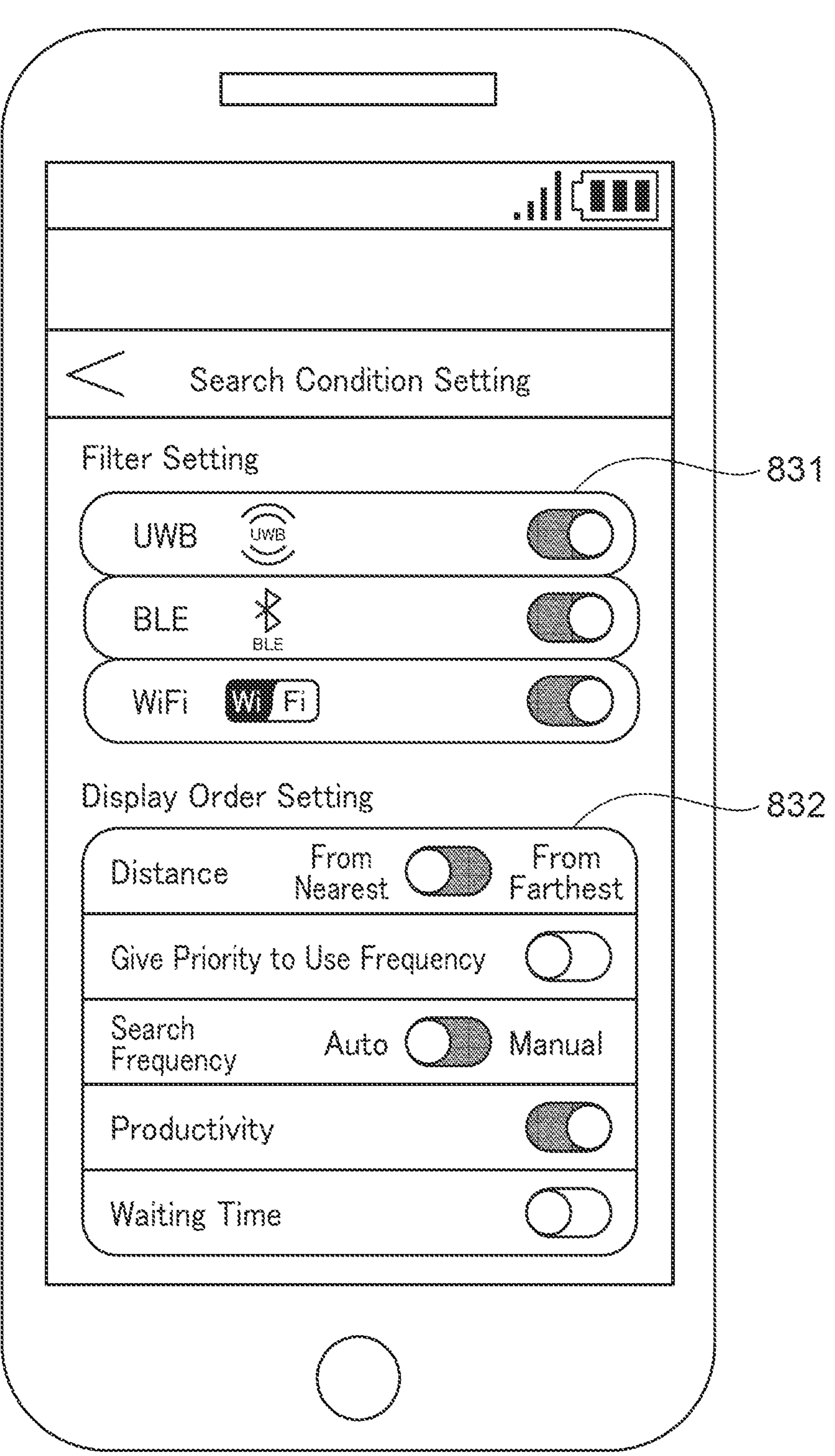
FIG. 8E is a view showing an example of a search condition setting screen of the mobile terminal.

As shown in FIG. 8E, wireless communication standard selection items 831 and display order selection items 832 are arranged on the search condition setting screen.

The wireless communication standard selection items 831 display wireless communication standards so that the user can select a wireless communication standard corresponding to a search target device as a condition for displaying search results on the device list display screen. Thus, the user can narrow down the search target device.

The display order selection items 832 display settings related to the display order of the search results so that the user can select. The example shown in FIG. 8E includes a Distance item that allows selection of the display order of the search targets according to the distance to the search target from the nearest or the farthest, a Search Frequency item that allows selection of whether the search frequency is set automatically or manually, etc.

When the Search Frequency item is "Auto", a default search frequency is set, and the update button 812 and the buttons 810*a* and 810*b* are displayed on the device list display screen so that the user can operate. In the meantime, when the Search Frequency item is "Manual", the buttons 810*a* and 810*b* cannot be operated by the user on the device list display screen, but the update button 812 is displayed so that the user can operate.

The search condition setting screen shown in FIG. 8E is a mere example and may include other selection items to provide a user interface that allows the user to operate the narrowing-down of the search results and the display order of the search results according to user's intention.

Figure 8F:
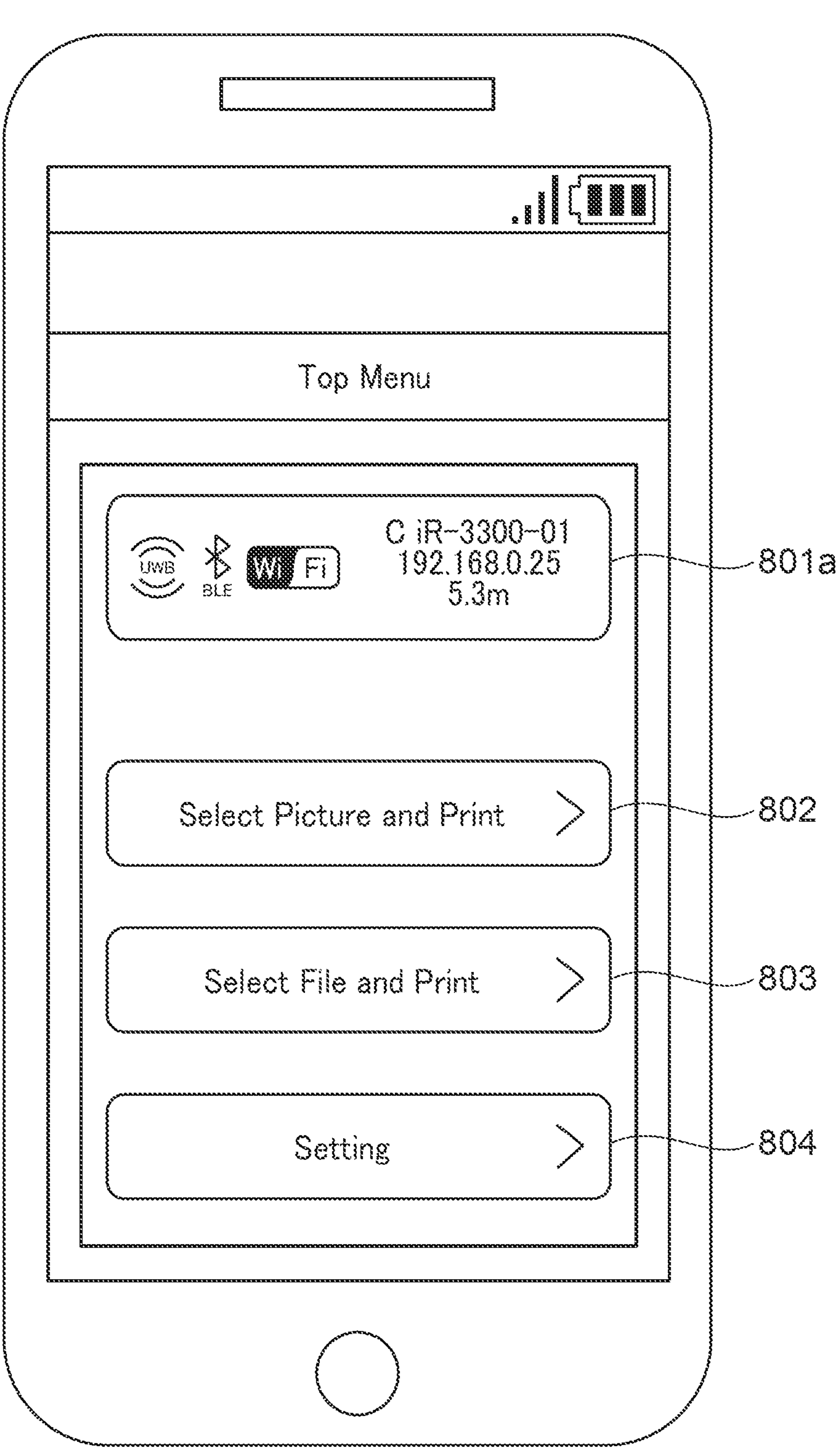
FIG. 8F is a view showing an example of a top menu screen of the mobile terminal.

Referring back to FIG. 7, the CPU 202 of the mobile terminal 101 next accepts a user's printer selection of one of the image forming apparatuses displayed in the device list 811 on the printer search screen (FIG. 8D) as a search target apparatus (step S711). When the printer selection is received, the display is switched from the device list display screen to the top menu screen (FIG. 8F). The display of the top menu screen is updated from the button 801 (FIG. 8A) indicating that no printer has been selected to a printer selection field 801*a* (FIG. 8F) indicating the contents of the selected printer.

Figure 8G:
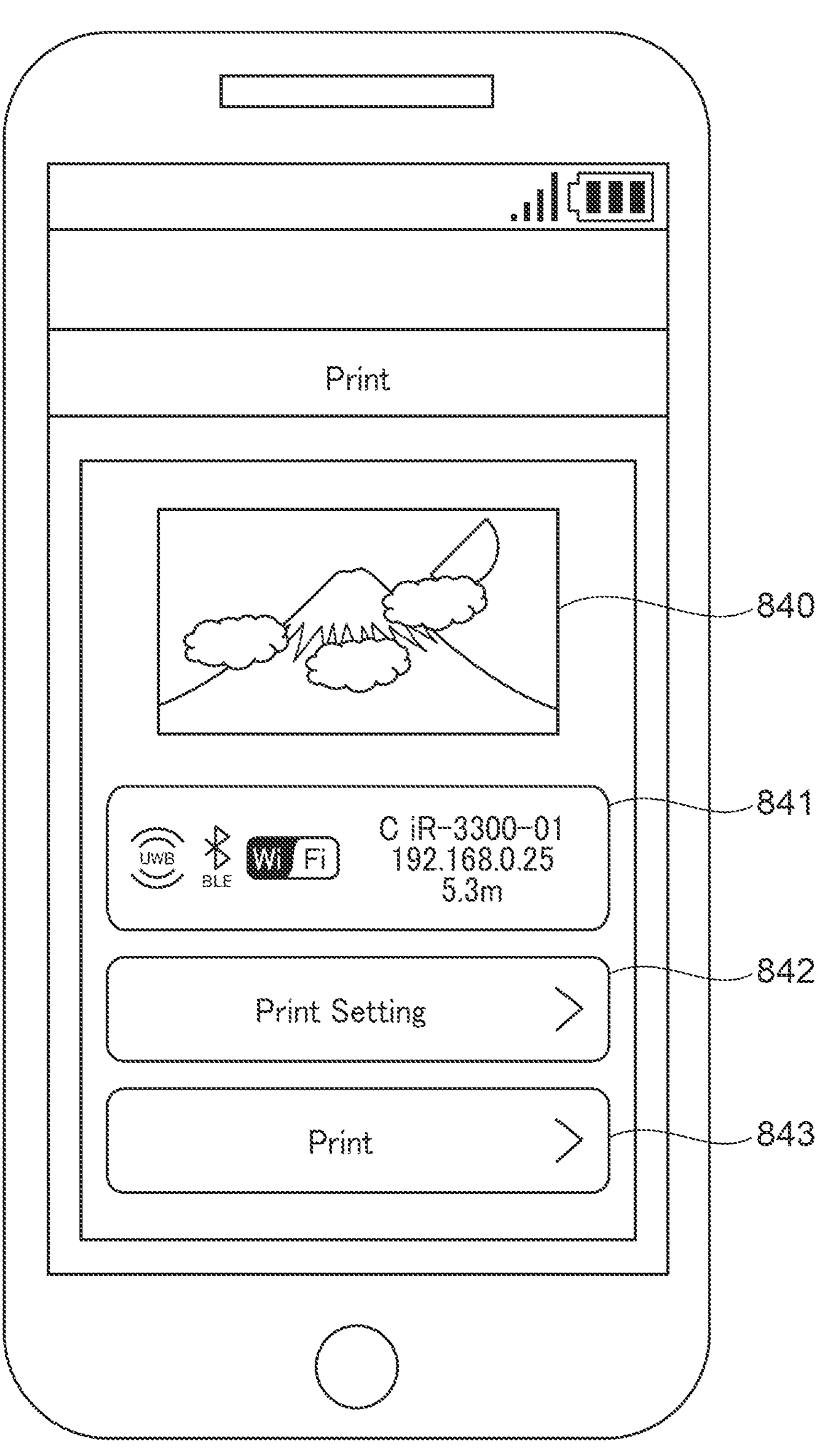
FIG. 8G is a view showing an example of a print instruction screen of the mobile terminal.

Next, the CPU 202 of the mobile terminal 101 accepts a print instruction from the user (step S712). For example, when an operation of the button 802 for selecting a photo as a document file of the print instruction target is accepted on the top menu screen (FIG. 8F), the CPU 202 switches the display to the print instruction screen (FIG. 8G). Thereafter, the CPU 202 receives a print instruction from the user on the print instruction screen (FIG. 8G).

The user can also operate the button 803 for selecting a file in data format, such as Word or PDF, as a document file of the print instruction target on the top menu screen (FIG. 8F).

The print instruction screen is a user interface for performing print setting on the document file (here, a photo) selected by the user and instructing execution of printing. As shown in FIG. 8G, the print instruction screen includes a preview area 840, a device information display area 841, a print setting button 842, and a print button 843.

A preview of a document file (here, a photo) selected by the user is displayed in the preview area 840. The apparatus information about the image forming apparatus (the image forming apparatus 104 in this case) of the print instruction target selected on the printer search screen (FIG. 8D) is displayed in the device information display area 841. When the user presses the print setting button 842, the display is switched to a print setting screen (not shown) to accept the print setting. The user sets a sheet size, a color mode, a sheet feed tray, the number of copies, etc. on the print setting screen. After that, the screen is returned to the print instruction screen shown in FIG. 8G.

Referring back to FIG. 7, when accepting the press of the print button 843 on the print instruction screen (FIG. 8G), the CPU 202 of the mobile terminal 101 generates a print job for printing the document file displayed in the preview area 840. Next, the CPU 202 transmits the generated print job to the image forming apparatus (here, the image forming apparatus 104) of the print instruction target of which the apparatus information is displayed in the device information display area 841 (step S713). Thereafter, when the screen returns to the top menu screen (FIG. 8A), the process at the side of the mobile terminal 101 is terminated.

Information about a transmission destination (a ranging target) of the ranging request in step S715, which will be described later, is added to the job data transmitted in the step S713, and the job data is transmitted to the image forming apparatus 104. Here, the information about the ranging target includes the UWB TAG information about the ranging target, the setting contents (UWB authentication setting information) input by the user on the UWB authentication setting screen (FIG. 8B), etc.

It should be noted that the method of adding the UWB TAG information etc. to the job data transmitted in the step S713 is not limited. For example, the UWB TAG information may be added to a header part of the job data transmitted in the step S713. Alternatively, the UWB TAG information etc. may be added to any field of the packet used for transmitting the job data.

The information transmitted in this way enables transmission of the information about the UWB TAG that is a ranging target carried by the user to the image forming apparatus 104. Although the case where the UWB TAG is the mobile terminal 101 has been described here, this is not limiting. For example, when the user arbitrarily sets a UWB TAG to be the ranging target on the tag setting screen in FIG. 8C, the UWB TAG information about the set UWB TAG may be added to the header part of the job data.

In the step S713, the job data is transmitted by handover to communication with a higher band, including Wi-Fi, Ethernet, or the like.

As described above, partner devices are identified and distances to the partner devices are measured in the process up to the moment that is executed by the mobile terminal 101 of searching for image forming apparatuses by the BLE communication and the UWB communication, and candidates of selectable devices are presented to the user using the result. This allows the user to easily designate the destination device of the job data and easily transmit the job data. Further, the UWB TAG information for specifying the ranging target (the transmission source (the mobile terminal 101) or another UWB TAG set by the user) is also transmitted to the transmission destination device together with the transmission of the job data. Therefore, the transmission destination device can perform ranging and positioning of the ranging target by the UWB communication.

Next, an operation of the image forming apparatus 104 that receives job data transmitted from the mobile terminal 101 will be described.

The job data transmitted from the mobile terminal 101 is recorded in the print server 150 (FIG. 3) or the print job management area 508 of the image forming apparatus 104. In the image forming apparatus 104, when the search module 503 receives the job data, the CPU 1201 obtains the UWB TAG information and the UWB authentication setting information about the ranging target added to the job data.

Thereafter, the CPU 1201 refers to the UWB TAG information to specify the ranging target (step S714). Here, the CPU 1201 arbitrates the Roles as the UWB device and determines the image forming apparatus 104 as the Anchor and the ranging target as the TAG. After that, the CPU 1201 performs a process in the step S715 to start measuring a distance between the image forming apparatus 104 and the ranging target.

Although the ranging target is the mobile terminal 101 in the example in FIG. 7, it may be a user-specified UWB TAG (not shown in FIG. 7). Hereinafter, the case where the ranging target is the mobile terminal 101 will be described.

In the step S715, the CPU 1201 transmits a ranging request packet to the ranging target (the mobile terminal 101 in this embodiment). The ranging request packet is a packet for requesting the ranging based on the UWB TAG information about the ranging target specified by the search module 503, and is generated by the CPU 1201 by calling the API of the UWB communication controller 506. The ranging request packet is a ranging packet in the format required for performing the TWR defined in the IEEE802.15.4 shown in FIG. 6, and may be a packet including at least ranging request identification information, request source address information, and request destination address information.

Next, when receiving the ranging request packet from the image forming apparatus 104, the CPU 202 of the mobile terminal 101 transmits a ranging response packet to the image forming apparatus 104 after a predetermined time elapses (step S716). When receiving the ranging response packet from the mobile terminal 101, the CPU 1201 of the image forming apparatus 104 calculates the distance between the image forming apparatus 104 and the mobile terminal 101 as the ranging target according to the TWR method shown in FIG. 6.

Next, the CPU 1201 of the image forming apparatus 104 performs a distance determination by comparing the distance information x obtained by the ranging with a threshold X. The threshold X is a value entered into the authentication distance entry field 823 on the UWB authentication setting screen in FIG. 8B. As a result of the distance determination, when x is smaller than X, the CPU 1201 determines that the user has approached the image forming apparatus 104. In this case, the CPU 1201 of the image forming apparatus 104 performs login authentication of the user who is logging in to the mobile terminal 101 (step S717).

Specifically, the CPU 1201 performs an authentication procedure with reference to the user account management area 509. In the user account management area 509, a user account like a login ID, a password, and arbitrary UWB TAG information for authentication are stored in association with each other as account information. The account information can be registered in the user account management area 509 in association with each other using a user interface on an operation screen (not shown).

In the authentication procedure, first, the UWB TAG information and the login ID that are added to the job data transmitted in the step S713 are obtained. Next, account control is performed to collate the obtained UWB TAG information and login ID with the UWB TAG information and login ID managed in the user account management area 509. When the collation result is matched, the login authentication (UWB authentication) is established.

Figure 10A:
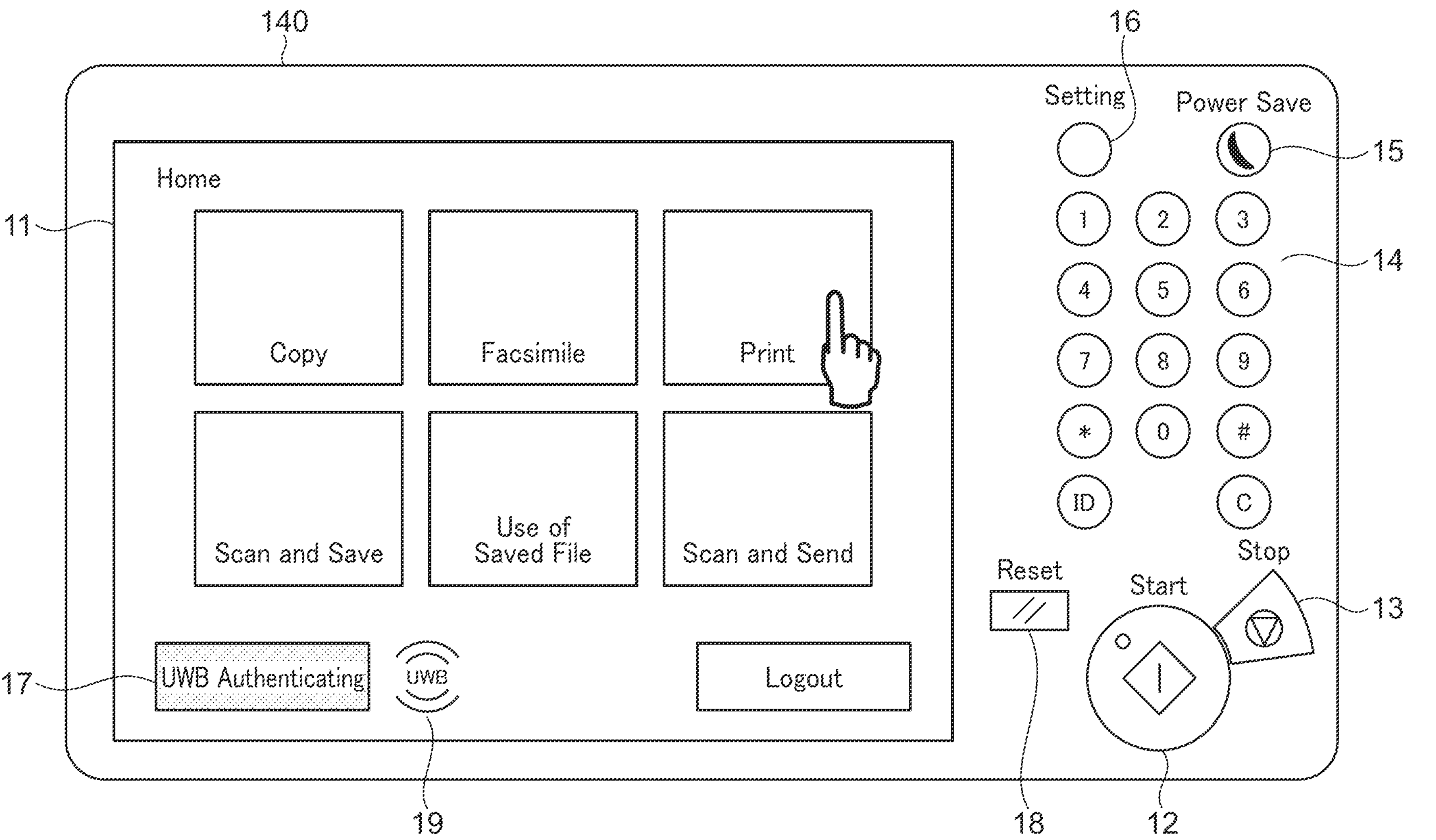
FIG. 10A is a view showing a home screen of the image forming apparatus.

When the login authentication is established, a home screen 11 is displayed on the operation unit 140 of the image forming apparatus 104 as shown in FIG. 10A. Function selection buttons to select functions, such as copy, facsimile, and print, are arranged on the home screen 11. In addition, a UWB authenticating icon 17 for clearly indicating that the authentication based on the UWB ranging is in progress and a UWB logo 19 are also displayed on the home screen 11. As a result of the distance determination, when x is equal to or more than X, the CPU 1201 may change the displayed authenticating icon 17 to an icon indicating another message, such as authenticated or non-authenticated, or may shift to an authentication request screen (not shown). This enables the user to recognize the authentication state based on the UWB ranging.

Referring back to FIG. 7, next, the CPU 1201 of the image forming apparatus 104 shifts the display from the home screen 11 to a print job selection screen 1100 (FIG. 10B) for accepting a selection input of job data associated with the user account of the authentication target. Thereafter, the CPU 1201 receives the job selection from the user on the print job selection screen 1100 (FIG. 10B) in step S718.

Figure 10B:
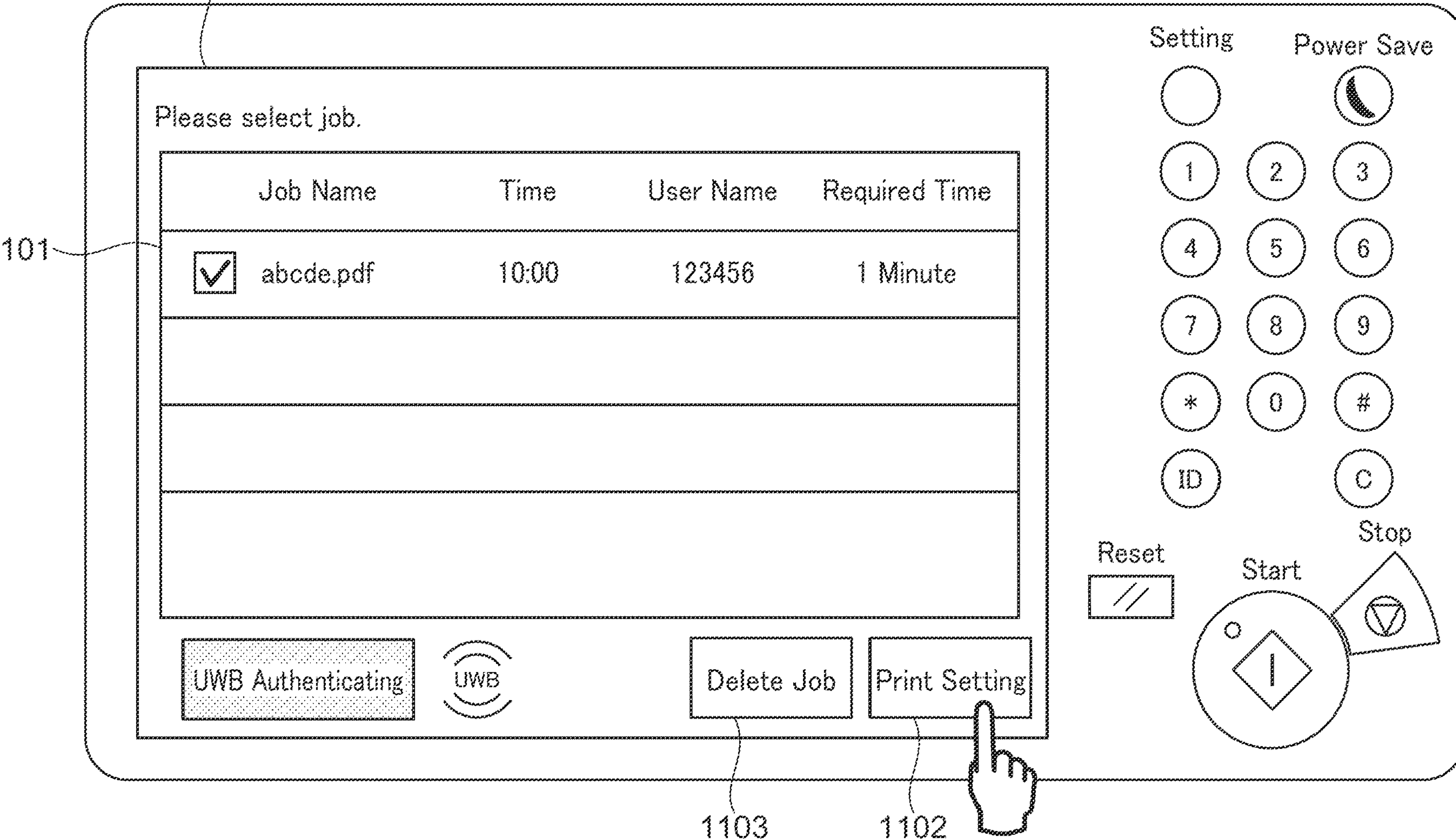
FIG. 10B is a view showing a print job selection screen of the image forming apparatus.

In the example of the print job selection screen 1100 shown in FIG. 10B, one job data is displayed so that the user can select and the details of the job is visualized so that the user can recognize. The information about the job data displayed on the print job selection screen 1100 is job information temporarily recorded in the print server 150 etc. and is information that can be referred to from the image forming apparatuses 105 to 107 connected to the LAN 103. Hereinafter, a case where the job 1101 (FIG. 10B) on the print job selection screen 1100 is selected by the user in the step S718 will be described.

Figure 10C:
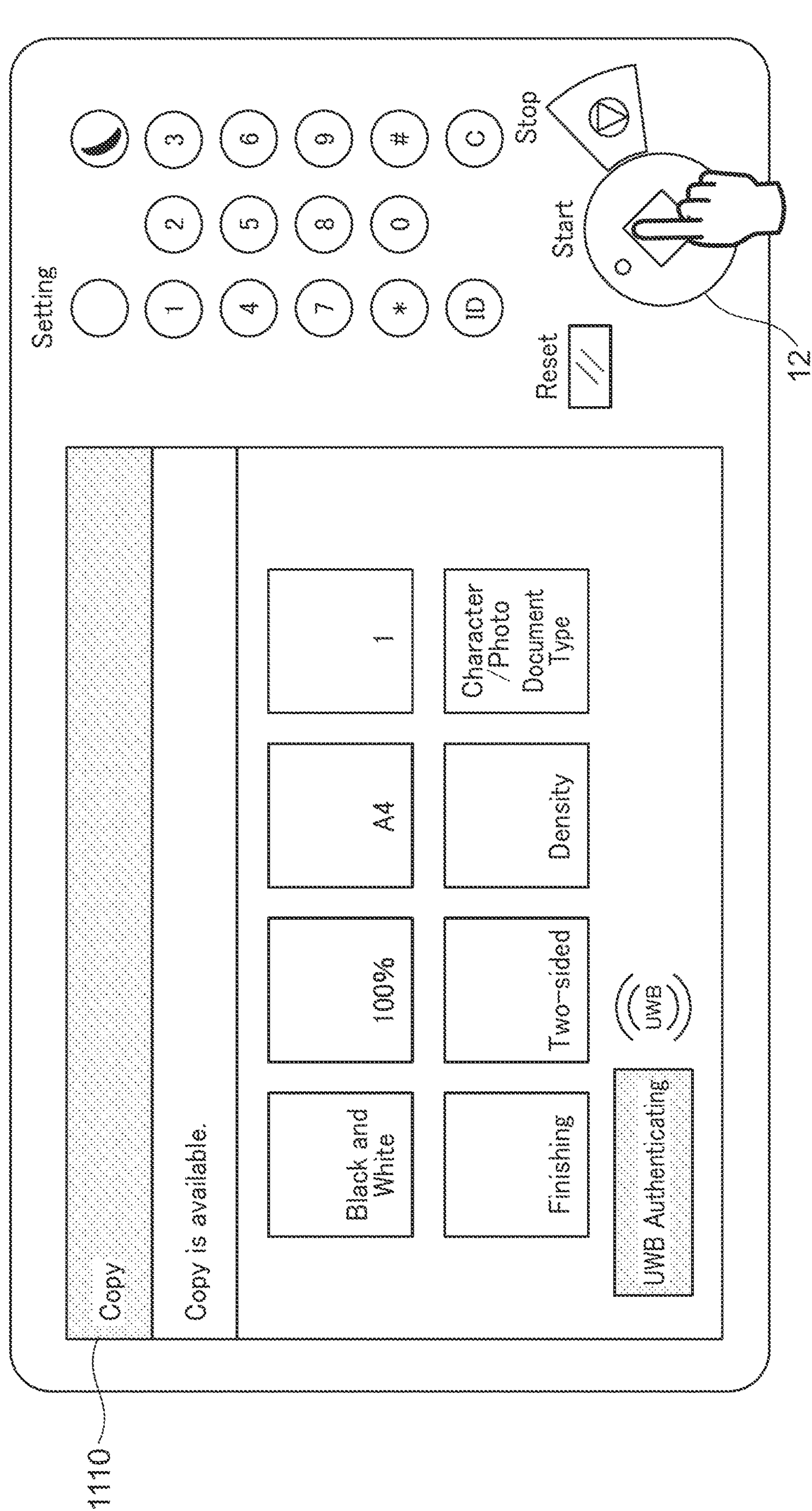
FIG. 10C is a view showing a print setting screen of the image forming apparatus.

As shown in FIG. 10B, buttons 1102 and 1103 are further arranged on the print job selection screen 1100. The button 1102 is a button for shifting the display to a print setting screen 1110 in FIG. 10C for accepting confirmation and change of the job setting of the job 1101. The button 1103 is a button for stopping the temporary recording of the job 1101 in the print server 150 etc. and deleting the job.

When accepting the press of the button 1102 in a state where the job 1101 to be printed is selected, the CPU 1201 displays the print setting screen 1110 on the operation unit 140. On the print setting screen 1110, the user performs detailed settings related to printing. When the user presses the start button 12, the CPU 1201 executes printing of the job 1101 (step S719).

Figure 11:
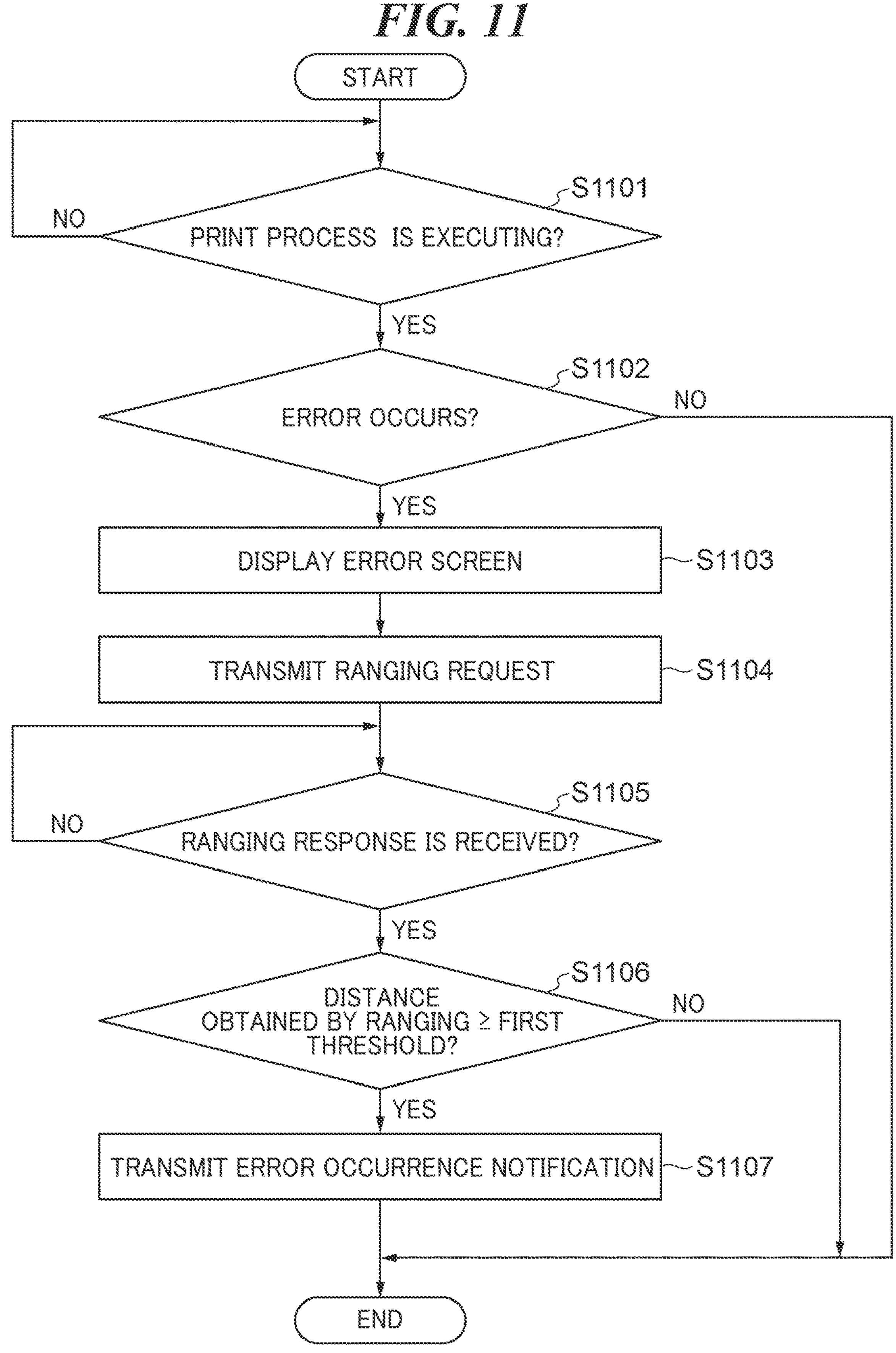
FIG. 11 is a flowchart showing a procedure of a notification control process in a step S720 in FIG. 7.

Next, the CPU 1201 executes a notification control process in FIG. 11 (step S720), and ends this process.

FIG. 11 is a flowchart showing a procedure of the notification control process in the step S720 in FIG. 7. The notification control process in FIG. 11 is achieved by the CPU 1201 executing a program deployed to the RAM 1202. Although the notification control process in FIG. 11 is executed after the printing of the job 1101 is started in the step S719 in this embodiment, this configuration is not limiting. For example, the notification control process in FIG. 11 may be executed in parallel with the step S719, that is, before the printing of the job 1101 is started.

In FIG. 11, first, the CPU 1201 determines whether the print process is executing (step S1101). When it is determined that the print process is executing (YES in the step S1101), the CPU 1201 determines whether an error occurs (step S1102). The error is, for example, an error due to occurrence of a jam like a paper jam, an error due to out of sheet, an error due to out of toner, or an error due to forgetting to take out a printed matter. The error types are not limited to these, and may be another error related to the image forming apparatus 104.

Figure 10D:
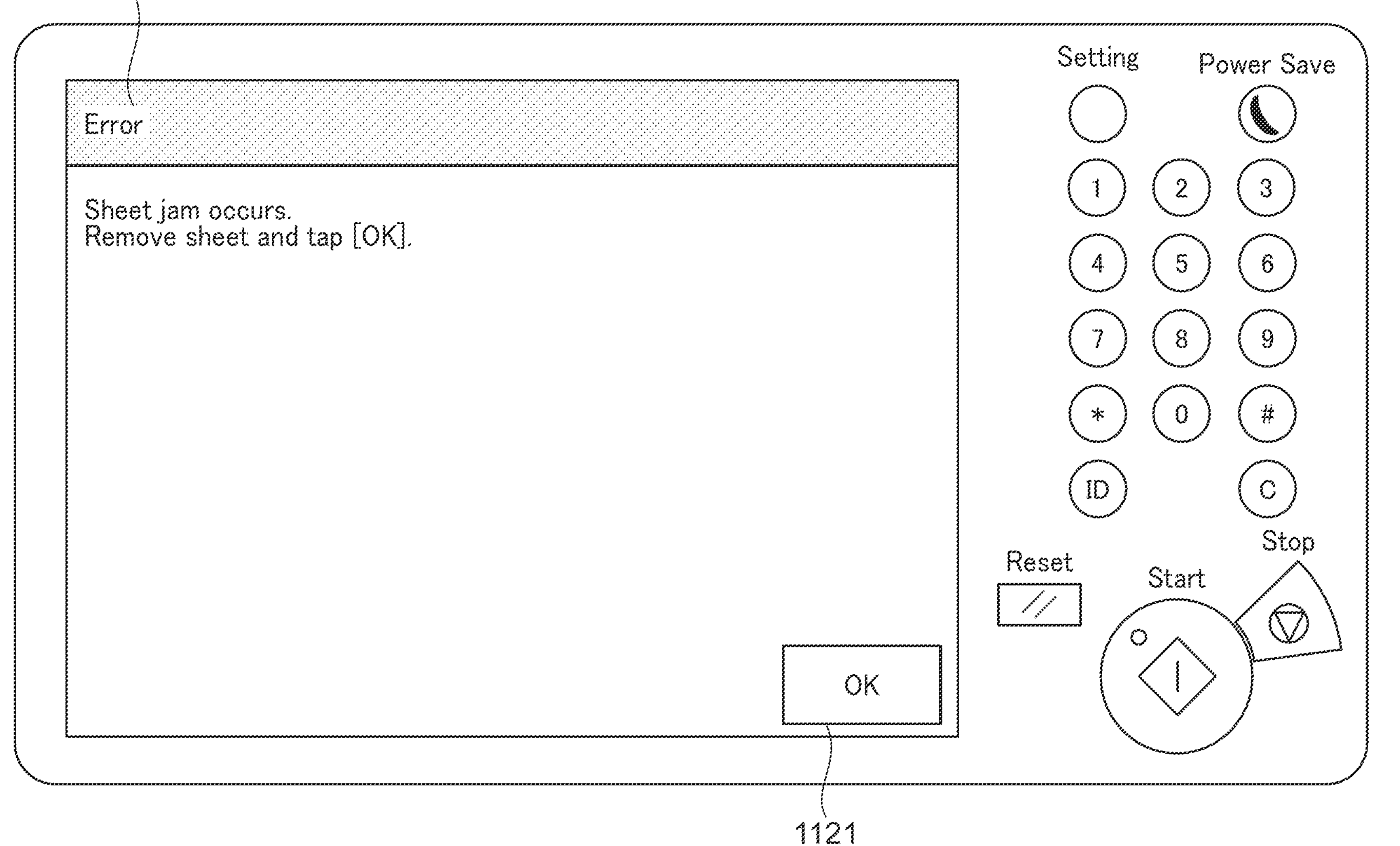
FIG. 10D is a view showing an error screen of the image forming apparatus.

When it is determined in the step S1102 that no error occurs, the notification control process ends. When it is determined in the step S1102 that an error occurs, the CPU 1201 displays an error screen 1120 in FIG. 10D on the operation unit 140 (step S1103). The error screen 1120 shows, for example, the contents of the error and a method of handling the error. When the user solves the error by performing the method of handling shown on the error screen 1120 and presses an "OK" button 1121 on the error screen 1120, the image forming apparatus 104 restarts the print process.

Next, the CPU 1201 transmits a ranging request packet to the mobile terminal 101 that is the request source of the print process under execution (step S1104). The CPU 1201 waits until a ranging response packet is received from the mobile terminal 101. When the ranging response packet is received from the mobile terminal 101 (YES in the step S1105), the CPU 1201 calculates a distance between the image forming apparatus 104 and the mobile terminal 101 according to the TWR method shown in FIG. 6. Next, the CPU 1201 determines whether the calculated distance is equal to or more than a first threshold set in advance by the user (step S1106). The first threshold is a distance to a position at which the user can notice the error screen displayed on the operation unit 140 of the image forming apparatus 104. For example, the first threshold is about 3 m.

When it is determined in the step S1106 that the distance obtained by the ranging is less than the first threshold, the notification control process is terminated. As described above, in this embodiment, when the user carrying the mobile terminal 101 is somewhat near the image forming apparatus 104, the error screen 1120 is displayed on the operation unit 140 of the image forming apparatus 104 as an error notification. This makes a user who is somewhat near the image forming apparatus 104 aware of the occurrence of the error.

When it is determined in the step S1106 that the distance obtained by the ranging is equal to or more than the first threshold, the CPU 1201 transmits an error occurrence notification to the mobile terminal 101, which is the job data transmission source, by the UWB communication (step S1107). The error occurrence notification is a notification for displaying a screen indicating occurrence of an error related to printing executed on the basis of the received job data on the display unit 215 of the mobile terminal 101.

Figure 8H:
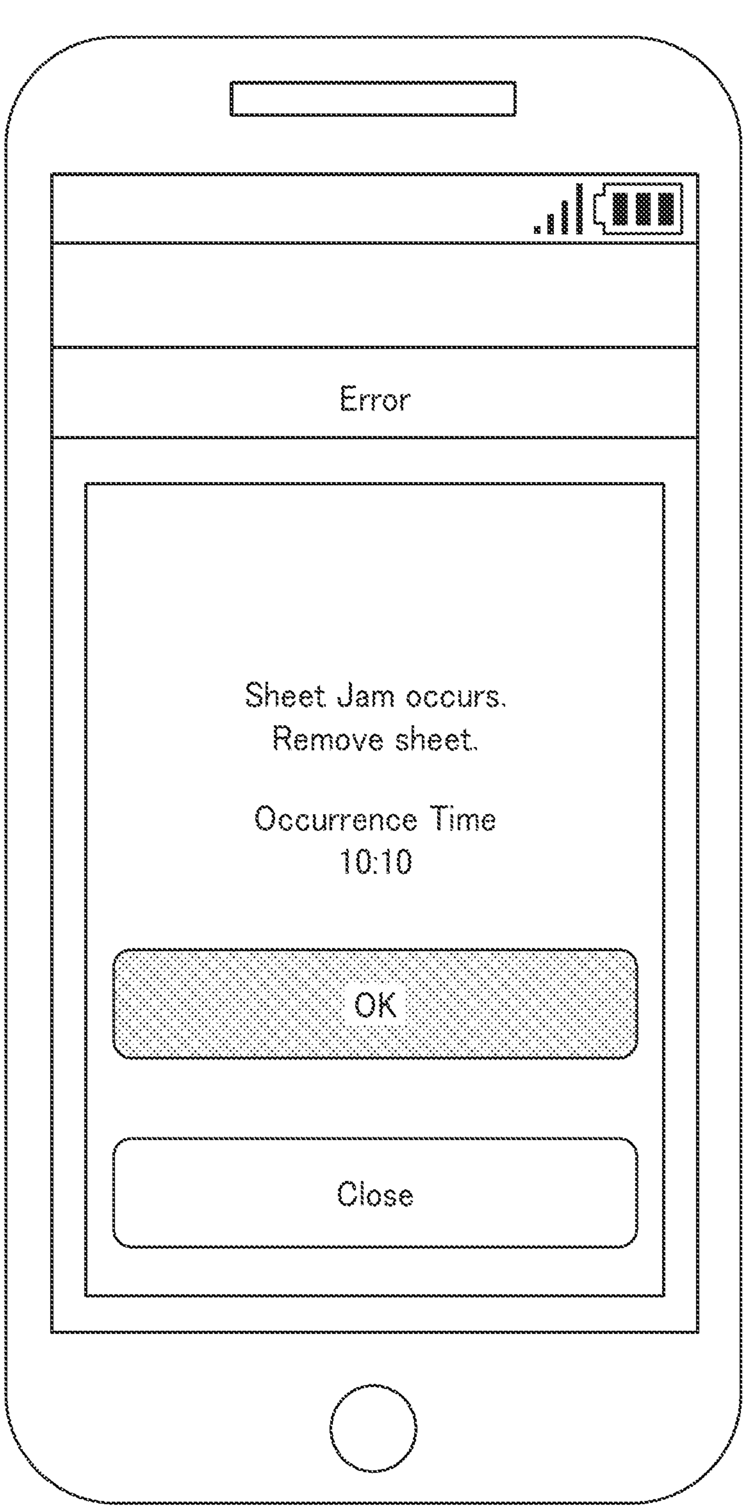
FIG. 8H is a view showing an example of an error screen of the mobile terminal.

When receiving the error occurrence notification, the CPU 202 of the mobile terminal 101 displays an error screen shown in FIG. 8H on the display unit 215. The error screen in FIG. 8H indicates, for example, the error contents and the error handling method as with the error screen 1120 displayed on the operation unit 140 of the image forming apparatus 104. As described above, in this embodiment, when the user carrying the mobile terminal 101 is so far away from the image forming apparatus 104 that the user cannot notice the error screen 1120 displayed on the operation unit 140 of the image forming apparatus 104, the error occurrence notification is transmitted to the mobile terminal 101. This makes a user aware of the occurrence of the error even when the user is so far away from the image forming apparatus 104 that the user cannot notice the error screen displayed on the operation unit 140. Thereafter, the notification control process is terminated.

According to the above-described embodiment, when the UWB TAG information is obtained by the BLE communication, the communication connection with the mobile terminal 101 by the BLE communication is disconnected and the communication connection by the UWB communication is established. When an error occurs, the user is notified of the error by a method other than the BLE communication based on the distance obtained according to the TWR method shown in FIG. 6. That is, when the user is notified of the error, the wireless communication between the image forming apparatus 104 and the mobile terminal 101 is switched to the UWB communication. This can prevent the mobile terminal 101 from continuing to occupy the BLE communication with the image forming apparatus 104 until the error handling is completed.

In the above-described embodiment, the image forming apparatus 104 executes the print process on the basis of job data received from the mobile terminal 101. This enables a mobile terminal of another user to perform the BLE communication with the image forming apparatus 104 even if an error related to the print process based on the job data received from the mobile terminal 101 occurs.

In the above-described embodiment, the error includes an error due to a paper jam, an error due to out of sheet, an error due to out of toner, and an error due to a printed matter left behind. Even if such an error occurs, the mobile terminal of another user can perform the BLE communication with the image forming apparatus 104.

Although the present invention has been described above using the above-described embodiment, the present invention is not limited to the above-described embodiment. For example, a user may be notified of an error by warning sound or lighting of a lamp (not shown).

Although one threshold is set for determining the error notification unit in this embodiment, a plurality of thresholds may be set.

FIG. 12 is a flowchart showing another procedure of the notification control process in the step S720 in FIG. 7. Since the notification control process in FIG. 12 is similar to the notification control process in FIG. 11. the following description will be focused on contents different from that of the notification control process in FIG. 11. The notification control process in FIG. 12 is also achieved by the CPU 1201 executing a program developed to the RAM 1202 as with the notification control process in FIG. 11 described above. Although a configuration in which the notification control process in FIG. 12 is executed after the printing of the job 1101 is started in the step S719 will be described in this embodiment, this configuration is not limiting. For example, the notification control process in FIG. 12 may be executed in parallel with the step S719, that is, before the printing of the job 1101 is started.

In FIG. 12, steps S1201 to S1205 that are the same processes as the steps S1101 to S1105 described above are performed. Next, the CPU 1201 determines whether the distance obtained according to the TWR method shown in FIG. 6 is equal to or more than a second threshold (step S1206). The second threshold is a distance to a point at which the user can notice the error screen displayed on the operation unit 140 of the image forming apparatus 104. For example, the second threshold is about 3 m.

When it is determined in the step S1206 that the distance obtained according to the TWR method shown in FIG. 6 is less than the second threshold, the notification control process ends.

When it is determined in the step S1206 that the distance obtained according to the TWR method shown in FIG. 6 is equal to or more than the second threshold, the CPU 1201 determines whether the distance is equal to or more than a third threshold preset by the user (step S1207). The third threshold is, for example, a distance to a position at which the user can notice the warning sound emitted from the image forming apparatus 104. For example, the third threshold is about 5 m.

When it is determined in the step S1207 that the distance obtained according to the TWR method shown in FIG. 6 is less than the third threshold, the notification control process proceeds to step S1208. In the step S1208, the CPU 1201 sounds a buzzer. In this way, when the user carrying the mobile terminal 101 is somewhat far from the image forming apparatus 104 but can notice the warning sound of the image forming apparatus 104, the buzzer is sounded in this embodiment. This makes a user aware of the occurrence of the error when the user is somewhat far from the image forming apparatus 104 but can notice the warning sound of the image forming apparatus 104. When the process in the step S1208 is completed, the notification control process is terminated.

When it is determined in the step S1207 that the distance obtained according to the TWR method shown in FIG. 6 is equal to or more than the third threshold, the notification control process proceeds to step S1209. In the step S1209, the CPU 1201 transmits an error occurrence notification to the mobile terminal 101, which is the job data transmission source, by the UWB communication as with the step S1107 described above. Thereafter, the notification control process is terminated.

In the above-described embodiment, the plurality of thresholds for determining the error notification unit are set. That is, the error notification unit is selected in a stepwise manner according to the distance between the user carrying the mobile terminal 101 and the image forming apparatus 104. This makes it possible to notify the user of the error by the method suitable for the distance between the user carrying the mobile terminal 101 and the image forming apparatus 104.

In this embodiment, the notification units may be selected on the basis of the distance obtained according to the TWR method shown in FIG. 6 and types of errors as shown in FIG. 13. The distances are classified to close (3 m), middle (5 m), and far (10 m), and the types of errors are classified to jam, out of sheet, and sheet left. This enables the user to be notified of the error by the method suitable for the type of the error in addition to the distance between the user carrying the mobile terminal 101 and the image forming apparatus 104.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2023-043061, filed Mar. 17, 2023, which is hereby incorporated by reference herein in its entirety.

What is claimed is:

1. An image forming apparatus including at least a printing function executable with a printing process, the information processing apparatus comprising:

a user interface including a display;

at least one memory storing instructions; and at least one processor that executes the instructions to:

obtain communication information from a mobile terminal using first wireless communication that uses a first wireless communication protocol, the communication information being necessary for establishing second wireless communication that uses a second wireless communication protocol different from the first wireless communication protocol;

disconnect the first wireless communication with the mobile terminal in response to receiving the communication information necessary for the second wireless communication;

establish the second wireless communication with the mobile terminal;

receive print job data from the mobile terminal using a third wireless communication that uses a third wireless communication protocol different from the first and second wireless communication protocols, wherein:

the print job data includes ranging information for specifying the mobile terminal;

execute the printing process based on the print job data received from the mobile terminal;

measure a distance between the image forming apparatus and the mobile terminal using the ranging information included in the print job data to perform the second wireless communication with the mobile terminal; and notify, in a case where an error relating to the printing process occurs, an error message indicative of the error by:

displaying on the display of the user interface, in a case where the measured distance is less than a preset threshold; and transmitting to the mobile terminal using a wireless communication protocol other than the first wireless communication protocol, in a case where the measured distance is equal to or greater than the preset threshold.

2. The image forming apparatus according to claim 1, wherein the first wireless communication protocol uses Bluetooth Low Energy standard.

3. The image forming apparatus according to claim 1, wherein the second wireless communication protocol uses Ultra Wide Band of IEEE802.15.4z standard.

4. The image forming apparatus according to claim 1, wherein the error includes an error due to paper jam, an error due to sheet out, an error due to toner out, and an error due to a printed matter left behind.

5. The image forming apparatus according to claim 1, wherein the error message to be transmitted to the mobile terminal is for displaying a screen on a display of the mobile terminal, indicating the occurrence of the error.

6. The image forming apparatus according to claim 1, wherein the error message to be displayed on the display is a screen indicating the occurrence of the error.

7. The image forming apparatus according to claim 6, further comprising:

a buzzer that emits notification sound, wherein the at least one processor causes the buzzer to emit the notification sound in a case where the measured distance is equal to or greater than the preset threshold but less than another preset threshold.

8. The image forming apparatus according to claim 1, wherein the third wireless communication protocol uses Wi-Fi standard.

9. A control method for an image forming apparatus including at least a printing function executable with a printing process, the control method comprising:

obtaining communication information from a mobile terminal using first wireless communication that uses a first wireless communication protocol, the communication information being necessary for establishing second wireless communication that uses a second wireless communication protocol different from the first wireless communication protocol;

disconnecting the first wireless communication connection with the mobile terminal in response to receiving the communication information necessary for the second wireless communication;

establishing the second wireless communication with the mobile terminal;

receiving print job data from the mobile terminal using a third wireless communication that uses a third wireless communication protocol different from the first and second wireless communication protocols, wherein:

the print job data includes ranging information for specifying the mobile terminal;

executing the printing process based on the print job data received from the mobile terminal;

measuring a distance between the image forming apparatus and the mobile terminal using the ranging information included in the print job data to perform the second wireless communication with the mobile terminal; and notifying, in a case where an error relating to the printing process occurs, an error message indicative of the error by:

displaying on a display of a user interface of the image forming apparatus, in a case where the measured distance is less than a preset threshold; and transmitting to the mobile terminal using a wireless communication protocol other than the first wireless communication protocol, in a case where the measured distance is equal to or greater than the preset threshold.

10. The control method according to claim 9, wherein the third wireless communication protocol uses Wi-Fi standard.

11. A non-transitory computer-readable storage medium storing a control program executable by a computer to execute a control method for an image forming apparatus including at least a printing function executable with a printing process, the control method comprising:

obtaining communication information from a mobile terminal using first wireless communication that uses a first wireless communication protocol, the communication information being necessary for establishing second wireless communication that uses a second wireless communication protocol different from the first wireless communication protocol;

disconnecting the first wireless communication connection with the mobile terminal in response to receiving the communication information necessary for the second wireless communication;

establishing the second wireless communication with the mobile terminal;

receiving print job data from the mobile terminal using a third wireless communication that uses a third wireless communication protocol different from the first and second wireless communication protocols, wherein:

the print job data includes ranging information for specifying the mobile terminal;

executing the printing process based on the print job data received from the mobile terminal;

measuring a distance between the image forming apparatus and the mobile terminal using the ranging information included in the print job data to perform the second wireless communication with the mobile terminal; and notifying, in a case where an error relating to the printing process occurs, an error message indicative of the error by:

displaying on a display of a user interface of the image forming apparatus, in a case where the measured distance is less than a preset threshold; and transmitting to the mobile terminal using a wireless communication protocol other than the first wireless communication protocol in a case where the measured distance is equal to or greater than the preset threshold.

12. The non-transitory computer-readable storage medium according to claim 11, wherein the third wireless communication protocol uses Wi-Fi standard.

* * * * *